TIME DIVISION MULTIPLEX TRANSMISSION SYSTEMS

Filed May 9, 1962 13 Sheets-Sheet 1

Inventors:
M. HERRY
J. P. LE CORRE
G. R. YELLOZ
By Phillip A. Weiss
Attorney

Sept. 20, 1966 M. J. HERRY ET AL 3,274,339

TIME DIVISION MULTIPLEX TRANSMISSION SYSTEMS

Filed May 9, 1962 13 Sheets-Sheet 2

Inventors:
M. HERRY
J. P. LE CORRE
G. R. YELLOZ
By Phillip A. Weiss
Attorney

TIME DIVISION MULTIPLEX TRANSMISSION SYSTEMS

Inventors:
M. HERRY
J. P. LE CORRE
G. R. YELLOZ
By Phillip A. Weiss
Attorney

Inventors:
M. HERRY
J. P. LE CORRE
G. R. YELLOZ
By Philip A. Weiss
Attorney

Inventors:
M. HERRY
J. P. LE CORRE
G. R. YELLOZ
By Philip A. Weiss
Attorney

Sept. 20, 1966 M. J. HERRY ETAL 3,274,339

TIME DIVISION MULTIPLEX TRANSMISSION SYSTEMS

Filed May 9, 1962 13 Sheets-Sheet 6

Inventors:
M. HERRY
J. P. LECORRE
G. R. YELLOZ

By Phillip A. Weiss
Attorney

Sept. 20, 1966 M. J. HERRY ET AL 3,274,339

TIME DIVISION MULTIPLEX TRANSMISSION SYSTEMS

Filed May 9, 1962 13 Sheets-Sheet 7

Inventors:
M. HERRY
J. P. LE CORRE
G. R. YELLOZ
By Philip A. Weiss
Attorney

Inventors:
M. HERRY
J. P. LECORRE
G. R. YELLOZ
By Phillip A. Weiss
Attorney

Inventors:
M. HERRY
J. P. LECORRE
G. R. YELLOZ
By Philip A. Weiss
Attorney

Inventors:
M. HERRY
J. P. LE CORRE
G. R. YELLOZ
By Phillip A. Weiss
Attorney

TIME DIVISION MULTIPLEX TRANSMISSION SYSTEMS

Inventors:
M. HERRY
J. P. LECORRE
G. R. YELLOZ
By Philip A. Weiss
Attorney

Inventors:
M. HERRY
J. P. LE CORRE
G. R. YELLOZ
By Phillip A. Weiss
Attorney

Inventors:
M. HERRY
J. P. LE CORRE
G. R. YELLOZ
By Phillip A. Weiss
Attorney

United States Patent Office 3,274,339

Patented Sept. 20, 1966

3,274,339

TIME DIVISION MULTIPLEX TRANSMISSION SYSTEMS

Michel Jean Herry, Aulnay-sous-Bois, Jean Pierre Le Corre, Sainte-Genevieve-des-Bois, and Guy Raphael Yelloz, Paris, France, assignors to International Standard Electric Corporation, New York, N.Y., a corporation of Delaware Filed May 9, 1962, Ser. No. 193,395
Claims priority, application France, May 10, 1961, 861,422, Patent 1,301,275
6 Claims. (Cl. 179—15)

The present invention concerns a synchronization device for signals applied at the input of a PCM telephone central exchange.

Generally, one calls "multiplex trunk" a communication channel on which are transmitted simultaneously several communications.

In time division systems, the $n$ information present in an analog form, which must be transmitted simultaneously on the trunk are sampled at each repetition period of the system.

In the device, according to the invention, the amplitude modulated pulses obtained by this operation are quantized then expressed, by known means, in a $x$ digit binary code which is transmitted in series form and the $n$ codes are transmitted successively during one repetition period.

This modulation process is called pulse code modulation or "PCM."

In the transmission process used, a time interval or "digit time slot" of fixed duration being assigned in a transmitting exchange to each one of the $x$ digits of a code, the presence of a 1 is characterized by the presence of a pulse at the corresponding moment, and the presence of a 0 is characterized by the absence of pulse in the corresponding moment.

It is well known that, in the transmission of the pulses characterizing a digit 1, pulses which will be designated further on under the name of "message signals," the time positions of said pulses may be affected by certain fluctuations.

Thus, the variations of the propagation conditions, in the medium used to carry out the transmission between a transmitting central exchange and a receiving central exchange introduce a variation of the repetition frequency of the message signals, the frequency of which is low and the amplitude important, this variation being called "slow fluctuation." On the other hand, the crosstalk between channels and between trunks, the noise, the induction effects of parasitic periodical signals, the interactions between the different signals constituting a code, introduce "fast fluctuations" of the time position of the message signal on either side of the mean position at which they ought to be if they were affected only by slow fluctuations. The repetition frequency of these fluctuations is relatively high and the amplitude low.

On the other hand, the time positions of the message signals are defined, in each transmitting central exchange by a local clock. Since the local clocks of the transmitting central exchange and of the receiving central exchange are not ideally stable, the combined effects of their drifts is added to the slow fluctuations defined hereabove.

It must be possible to switch the informations carried by one of the channels of an incoming trunk to the receiving central exchange, on anyone of the channels of a certain number of outgoing trunks. The French Patent No. 1,212,984 "Switching systems between multiplex communication channels" describes one channel of achieving such a PCM switching device. Further on, "incoming trunk" will designate the trunk on which the informations arrive at the receiving central exchange and "outgoing trunk" the trunk on which they go out of the central exchange.

In the device described in this patent, the message signals appearing on the channels of a given incoming trunk are stored in a "data store" associated with said trunk, this operation being controlled by signals delivered by the clock of the receiving exchange. In said store, a unique address is assigned to each one of the digit time slots of each one of the channels.

Since the received signals are effected by the above stated fluctuations the time scale on which they aligned is different from that established by the clock of the receiving exchange. Before recording these signals in the data store, it is thus necessary to treat them in circuits known as "synchronization circuits" which suppress the effect of these fluctuations and position them on the time scale established by the local clock of the receiving exchange.

On the other hand, the different channels of a given incoming trunk being switched on several trunks, this makes necessary the use of a time scale common to the incoming trunks and to the outgoing trunks.

The object of the present invention is thus to enable the inscription of the message signals transmitted on a time division multiplex trunk, associated to a PCM telephone exchange in a data store associated to said trunk, this inscription being carried out without any loss of information signals and this whatever the amplitude of the slow fluctuations undergone by these signals may be.

Another object of the invention consists in increasing to the maximum the admissible amplitude of the fast fluctuations above which there is loss of information.

Another object of the invention consists in reducing to the minimum the loss of information during the reading of the data store, these losses being induced by the fact that the trunk time is different from the exchange time.

The invention will be particularly described with reference to the accompanying drawings in which.

Figure 14:
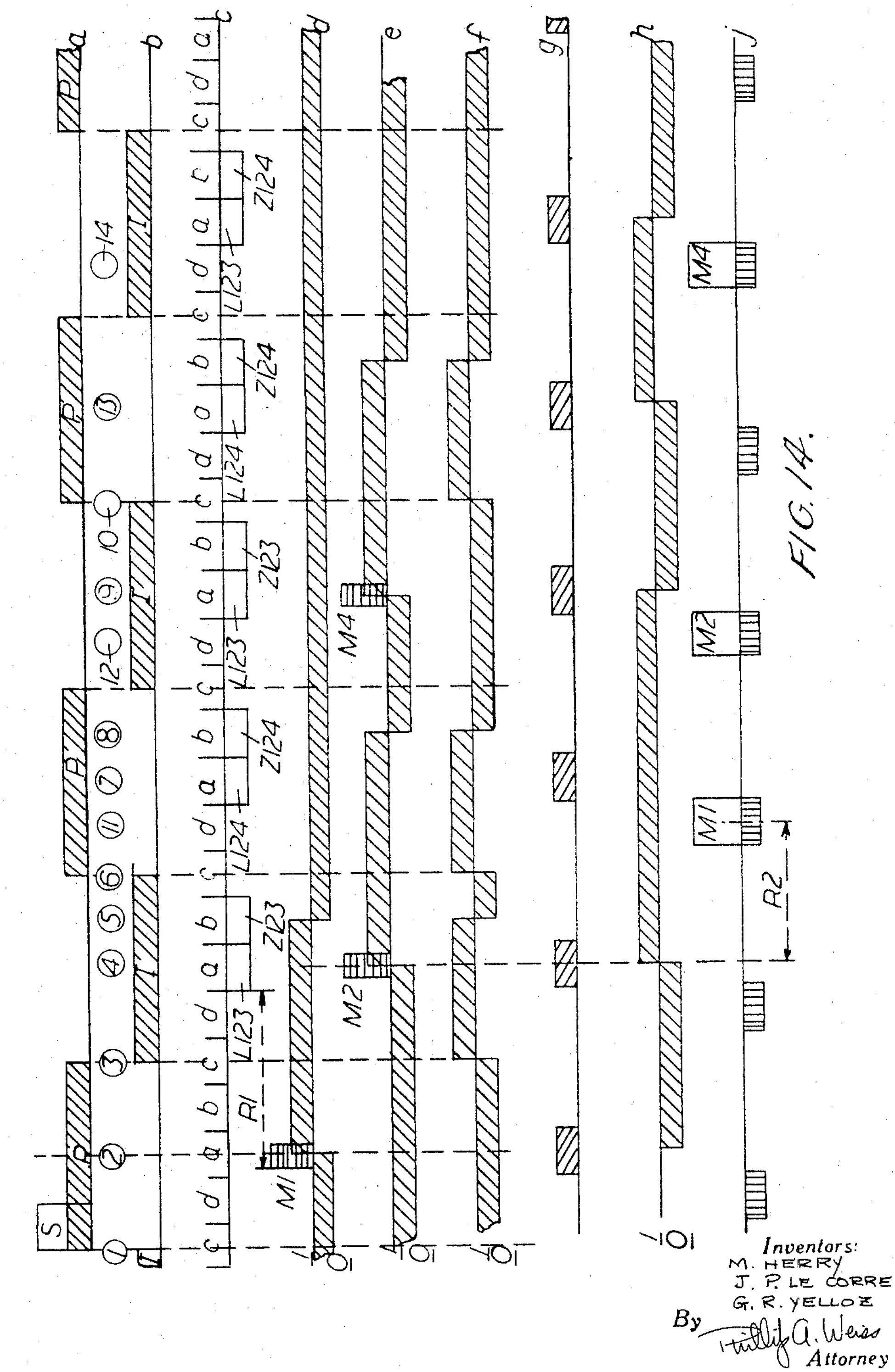

FIGURE 14 shows the diagrams of the signals appearing in several points of the circuits 130 and 140 of the retiming unit 120.

Figure 15:
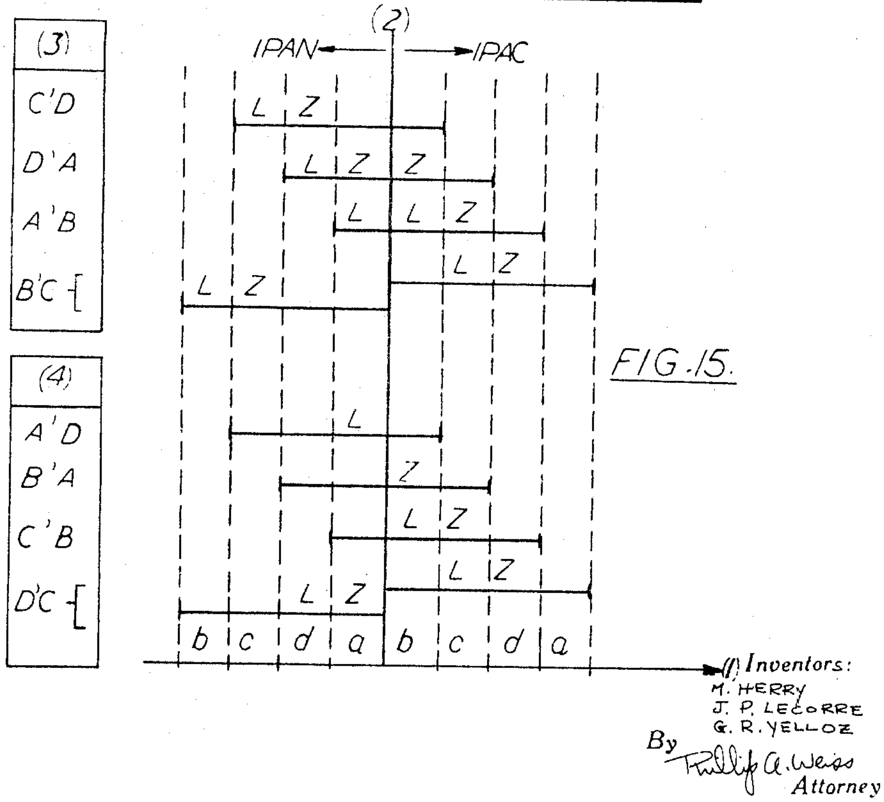

FIGURE 15 shows the diagram of the signals concerning the modification of the position information.

Figure 16:
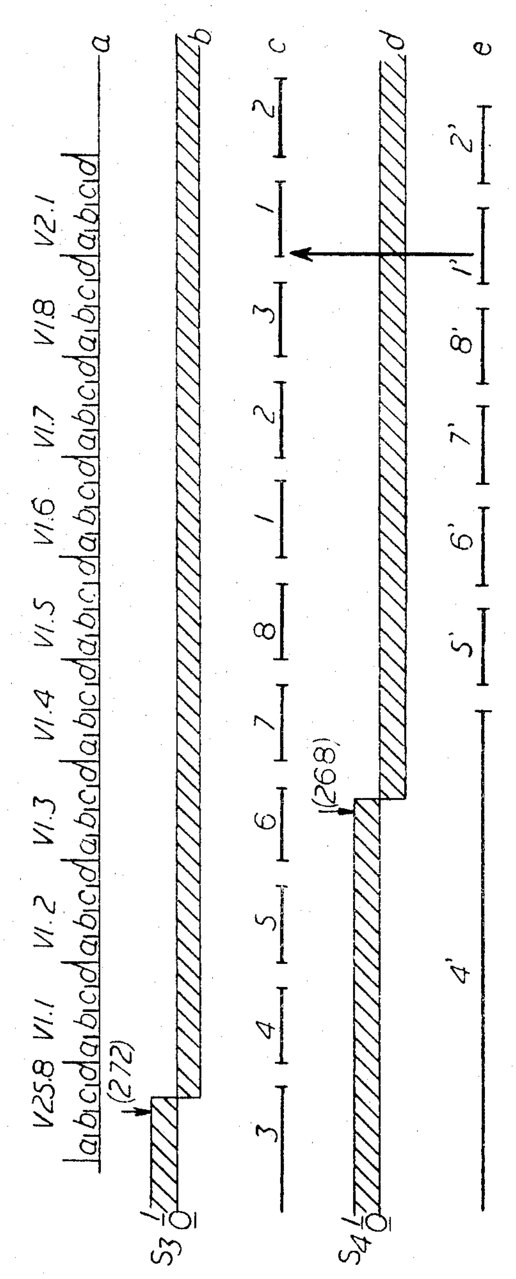

FIGURE 16 shows the diagram of the positions of the digit time slot counters during their resetting.

Before undertaking the description of the invention, the principle of the notations in logical algebra which will be used in certain cases for simplifying the writing in the description of logical operations, will be briefly given the subject is treated comprehensively in many texts and in particular in the book "Logical design of digital computers" of M. Phister (J. Wiley Editor).

Thus, if A designates a condtion characterized by the presence of a signal, $\bar{A}$ will designate the condition characterized by the absence of said signal.

These two conditions are related by the well known logical relation $A \times \bar{A} = 0$ in which the sign "*x*" is the symbol of the coincidence logical function or "AND" function.

If a condition C appears only if conditions A and B are simultaneously present, one writes $A \times B = C$ and this function is carried out through a coincidence gate or AND circuit.

If a condition C appears when one only of the two conditions E and F are present, one writes $E+F=C$ and this function is carried out through a mixer gate or OR circuit.

Since these AND and OR logical functions are commutative, associative and distributive, one may write $A+B=B+A$; $A \times (B+C) = AB+AC$;

$$(A+B)(C+D) = A \times C + A \times D + B \times C + B \times D$$

etc.

Last, a function of two variables may represent four possible combinations and if one writes $A \times B$, the three others are represented as a whole by the expression $\overline{A \times B}$.

Now the characteristics of the signals treated will be defined and their time relations will be established.

The description will concern, as a non limitative example, a PCM switching system wherein the informations presented in an analog form are sampled 10,000 times per second, i.e. each 100 microseconds.

A trunk is the support of 25 different information channels appearing in time succession each one of them occupying 4 microseconds.

The sampling of the analog information, delivers amplitude modulated pulses which are coded in a 7 digit binary code. The whole of these 7 digits to which an 8th digit used as "guard digit" is added, constitutes a message related to one channel, and each one of the pulses present in such a message will be called "message signal." The duration of a digit time slot is thus 500 ns. (ns. is the abbreviation of $10^{-9}$ seconds).

The first 24 channels of a trunk carry messages and the 25th carries a synchronization code utilized in the research of the time origin on the trunk.

The duration of the transmission of the 25 channels on one trunk will be called "repetition period."

It will be now assumed that the messages are transmitted on an outgoing trunk of a transmitting central exchange towards an incoming trunk of a receiving central exchange, that each one of the 200 digit time slots (8 digit time slots per channel, 25 channels) carries a message signal and that all these signals are distributed along equal time intervals.

The message signals belonging to the first channel will be designated by W1.1 to W1.8, those belonging to the second channel will be designated by W2.1 to W2.8, etc.

As explained hereabove, these signals are effected in the transmission by slow and rapid fluctuations, so that they are not regularly spaced at the input of the receiving central exchange.

Figure 1:
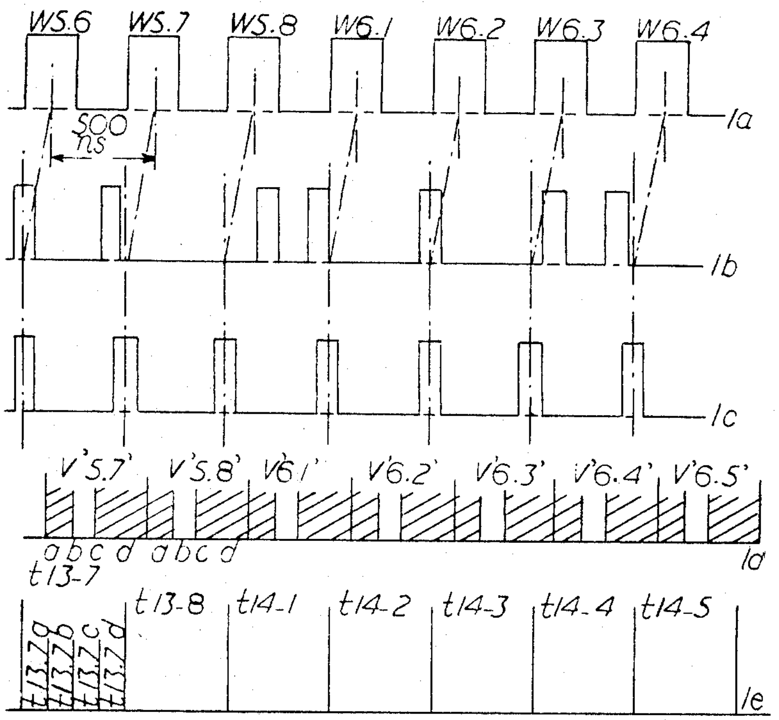
FIGURE 1 shows the diagrams of the different signals and time slots to which reference shall be made during the course of the description.

FIGURE 1 shows different signals and time slots.

FIGURE 1*a* shows the message signals W5.6 to W6.4 originating from transmitting central exchange and which are separated by a distance equal to their duration. The distance between the middle points or mean positions of the signals is equal to the duration of a digit time slot i.e. 500 ns.

FIGURE 1*b* represents the succession of the same signals on the incoming trunk of the receiving central exchange after passage through a regenerative repeater and normalization to a duration of 100 ns.

Under the effect of the slow fluctuation, the mean positions of these signals, shown on the figure by vertical dot and dash lines, are shifted with respect to the mean positions established during the transmission. Furthermore, this slow fluctuation corresponding to a variation of the repetition frequency of the signals, the distance between the mean positions is different at the transmitting and receiving ends but, since this difference is very small, it has not been shown on the figure.

On the other hand, the effect of the rapid fluctuations corresponds to a shifting of the regenerated message signal with respect to its mean position. Thus the signals W5.6 and W6.2 have been shown on the FIGURE 1*b* centred with respect to their mean position whereas the centre points of the other signals lead or lag with respect to their mean positions.

It is thus seen that, at the incoming of the receiving exchange, the time separating the arrival of two successive signals may vary within large proportions. Furthermore, in a real transmission, a message does not comprise message signals at each digit time slot so that it may be very difficult to detect, for instance, a digit 0 placed between two digits 1.

The effect of these fluctuations is thus to modify the time scale on which the message signals are positioned so that the "trunk time" is not constant.

On the other hand, the switching function carried out in the central exchange between $n_1$ incoming trunks and $n_2$ outgoing trunks, makes necessary the use of a constant time scale or "exchange time." It is thus necessary to convert the trunk time to the exchange time, this operation being carried out through a buffer memory called data store. The message signals will be registered therein at the same average frequency as that of the trunk time and will be read therefrom at the exchange time.

The exchange time is elaborated by a local clock delivering channel time slots, signals referenced *t*1 to *t*25, having each a duration of 4 μs. Each channel time slot is subdivided into 8 digit time slots 1 to 8, these latter being also subdivided into 4 basic time slots *a*, *b*, *c*, *d*. In this notation system, the basic time slot *c* of the 6th digit time slot of the 4th channel time slot shall be written *t*4.6*c*.

FIGURE 1*e* shows some successive digit time slots at the exchange time $t$13.7 to $t'$14.5, the basic time slots being represented in the digit time slot $t$13.7.

The data store is organized in a matrix form and includes 24 columns and 7 lines. The selection of an address is carried out by coincidence of the signals supplied respectively by a digit selector and by a channel selector which advances at the exchange time. More precisely, the digit selector advances by one position at each basic time slot $c$, the channel selector advances of one position when the digit selector is in position 8, and the inscription of a message signal is carried out at time slot $b$.

The addresses shown out are referenced V′1.1′, V′1.2′, V′1.3′ etc. . . . and they must be selected at the precise time when the message signals W1.1, W2.2, W2.3 etc. . . . appear on the incoming trunk.

The rapid fluctuations being suppressed by means which will be described further on, the message signals are centered on their mean position as shown on FIGURE 1$c$.

FIGURE 1$d$ shows the selection, in time succession of the addresses V′5.7 to V′6.7 in the data store, only the basic time slots $b$ during which the writing may be carried out not being hatched. By comparing with the FIGURE 1$c$, it is seen that the normalized message signals appear, in this example, with a certain time lag with respect to the selection time of the addresses which are assigned to them.

It is thus necessary to provide for a device which will correct the message signal position and which will operate in the case when, the message signals being initially correctly aligned with respect to the store addresses, the slow fluctuation modifies this relation.

In order to obtain that, a reference signal at the trunk time is elaborated from the normalized signals, and the position of this reference signal is compared to the basic time slot signals $a$, $b$, $c$, $d$ from which depends the advance of the address selector of the data store.

According to the one or several basic time slots with which the signal coincides, one determines the time delay which must be introduced, so that the message signal presents itself at the input of the store, at the basic time slot $b$ assigned to the inscription.

This is no more sufficient, when the amplitude of the slow fluctuation reaches one digit time slot. After having detected this condition, one must carry out a correction by acting on the advance of the digit selector of the store by means of a particular device. This action corresponds either to the insertion of an additional time signal $c$ or to the suppression of a time signal $c$ (it will be reminded that the basic time slot $c$ is that at which the advance of this selector is carried out).

This operation is performed by the synchronization circuits of the pulses.

This pulse synchronization gives a result which may be considered as good only for the initial conditions previously set, i.e. that the message signals were initially correctly aligned with respect to the addresses of the data store. If, owing to a disturbance, this condition is no more fulfilled, it is necessary to search for the origin of the messages on the trunk, and to modify accordingly the display of the addresses in the store.

For that, a search of the synchronization code is carried out when a disturbance is detected. When this code is found out, one knows that the signal W25.8 is just received and the synchronism is reset by acting on the address selector of the store so that, at the following digit time slot, the address V′1.1 is selected in said store. These operations are carried out by the channel synchronization circuits.

In the device according to the invention, a PCM exchange will be considered which switches the messages between $n_1$ incoming trunks $E_1$ to $E_n$ and $n_2$ outgoing trunks $S_1$ to $S_n$. It thus comprises $n_1$ incoming trunk circuits and a common circuit delivering switching information, which may be called "common switching circuit."

The performance of the synchronization operations concerning the message signals and the channels, requires the insertion of particular circuits in each one of the $n_1$ incoming trunk circuits and the addition of a second circuit common to all the incoming trunks which will be called "common synchronization circuit."

If one considers, at a given moment, the whole assembly constituted by the trunk synchronization circuits on which one operates and by the common synchronization circuit, this assembly performs two distinct functions; the pulse synchronization function and the channel synchronization function.

These synchronization operations, which will be now defined more accurately, have been studied briefly, in relation with FIGURE 1.

The pulse synchronization function consists in resetting the message signals affected by slow fluctuations, on time positions defined by the exchange clock while suppressing, at the same time, the rapid fluctuations by which they are also affected. This retiming is carried out by switching the message signals to discrete phase shifts. When the sum of these phase shifts, i.e. the amplitude of the slow fluctuation reaches nearly one digit time slot, the circuit delivers an error signal which acts upon the address selectors of the store during the passage of the synchronization channel, in order to correct the effect of the said slow fluctuation.

The function of channel synchronization consists in finding, at the setting into operation of the trunk, the synchronization code which occupies the 25th channel, the information thus obtained being used to reset the address selectors of the store in order that each message signal be stored at its unique address. It consists also in verifying periodically further on that the synchronization code arrives during the time which is assigned to it and in the opposite case to perform a new channel synchronization operation.

The performance of these operations is controlled by three programmes the development of which is controlled by the time signals delivered by the central exchange clock:

The programme I for the elaboration of the error signal relative to the pulse synchronization, The programme II for the correction of this error, The programme III for the channel synchronization.

Figure 2:
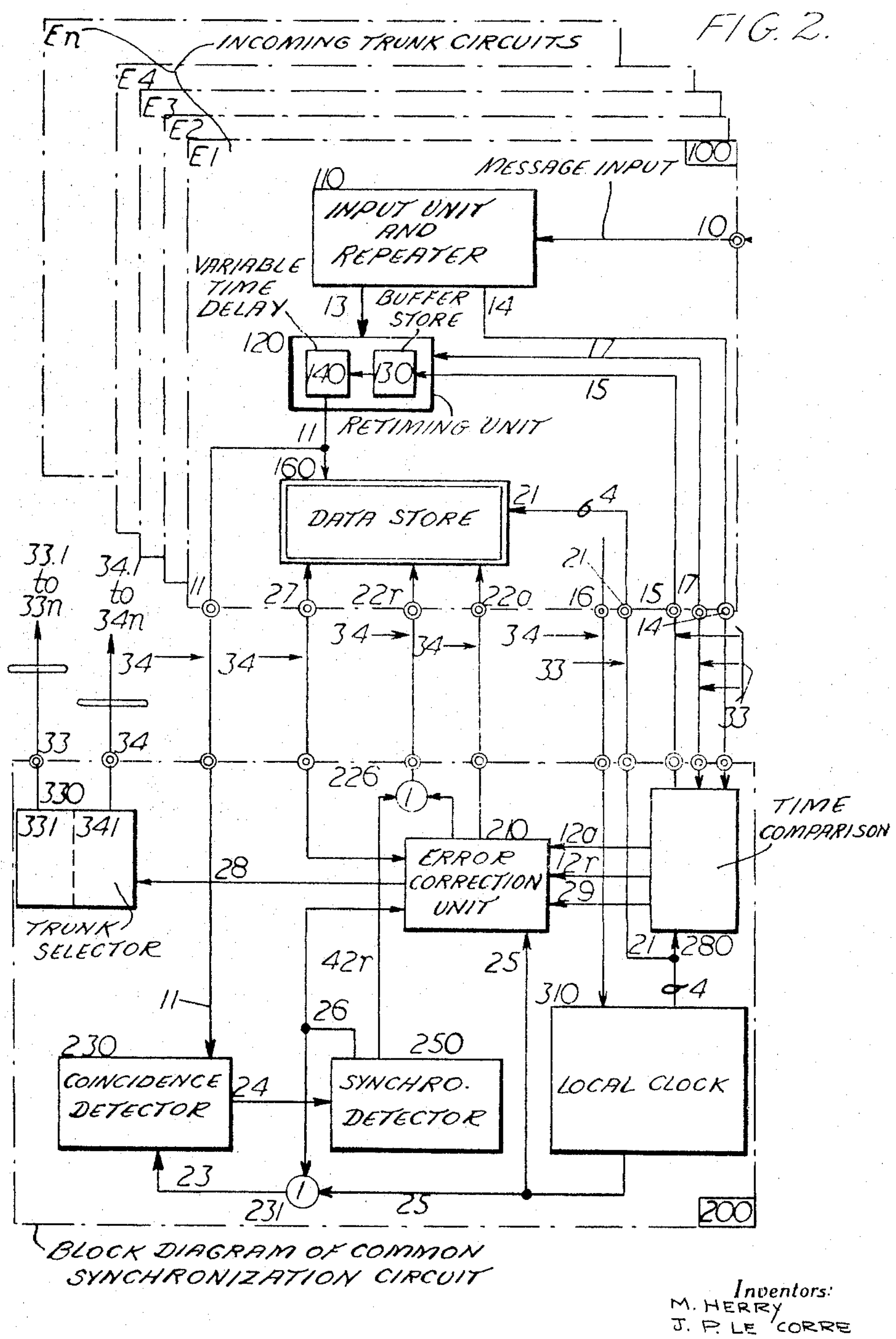
FIGURE 2 shows the schematic diagrams of the circuits constituting the synchronization device, object of the invention.

FIGURE 2 represents the schematic diagram of the circuits constituting the synchronization device according to the invention.

A certain number of incoming trunk circuits $E_1$, $E_2$, $E_3$, $E_4$ . . . $E_n$ which are periodically connected to the common synchronization circuit carrying the reference 200, have been shown.

The message signals sent by a transmitting exchange are applied at the incoming terminal 10 of one of the trunk circuits, the circuit $E_1$ per instance which is referenced 100 . . .

The selection of one among $n_1$ incoming trunks is carried out through trunk selectors 331 and 341 located in the trunk selection unit 330, each of these selectors comprising $n_1$ outgoing conductors 33–$l$ to 33–$n$ and 34–$l$ to 34–$n$.

The selector 331 is assigned to the choice of the trunk on which must be carried out an examination of the position of the message signals with respect to the signals delivered by the local clock (Programme I) and the selector 341 is assigned to the choice of the trunk on which one must carry out, first, a correction of the pulse synchronization (Programme II) and on the other hand, a check of the channel synchronization (Programme III).

The $n_1$ incoming trunks are connected to the common circuit 200 through as many groups of $n_1$ AND circuits as there are connections to be set up from the circuit 200. The presence of a signal on one of the outputs 33 or 34 enables the activation of the AND circuits associated to these trunks.

FIGURE 2 represents the groups of AND circuits, in a symbolic channel, by an arrow perpendicular to the link conductor considered, this arrow being referenced 33 or 34 according to the group of AND circuits considered, is assigned to the operations controlled respectively by the programme I or by the programmes II and III.

These incoming signals 10 are applied to the input unit 110 which comprises a repeater and a circuit for the elaboration of the reference information which will characterize the time on the trunk. The repeater delivers, on its output 13, a normalized signal such as the signals W5.6, W5.7 etc. . . . shown on FIGURE 1*b*, and the second circuit delivers on its output 14 a reference signal, characterizing the trunk time of a width equal to the width of a basic time slot (*a*, *b*, *c*, *d*) delivered by the local clock 310 on the group of 4 conductors 21 and presenting a constant phase shift with respect to the mean position of the signal 13.

One will describe, first, the principle of operation of the group of circuits dealing with the pulse synchronization which is controlled by the programme I.

The normalized signal 13 is applied to the retiming unit 120, which comprises, a first, a buffer store 130 in which the signals are stored at the trunk time and read at the central exchange time and, second, a variable time delay circuit 140.

This inscription of the message signal can be carried out in a correct channel only if the amplitude of the rapid fluctuations which affect it does not exceed a finite value which will be calculated during the detailed study of the circuits. Owing to the fact that the signal used are obtained from this buffer memory, they are free from all rapid fluctuations.

The slow fluctuation, the mechanism of which has been previously discussed corresponds to a phase shift according to time of the message signal with respect to the exchange time.

This phase shift is measured periodically and at short intervals in the block 280 of comparison between the trunk and local times this operation being controlled by the programme I.

In order to simplify the description of the mechanism of this comparison, while obtaining results which are valid for the general case, it will be assumed that the reference signal 14 of the trunk time, is ideally narrow and that it can thus coincide only with one single basic time slot signal of the exchange time.

In these conditions it will be admitted that when this reference signal 14 coincides with the middle point of the basic time slots *d*, *a*, *b* or *c* (exchange time) the result of the comparison carried out by the circuit 280 is respectively an information A, B, C or D that will be called later on the "present position information."

Figure 3:
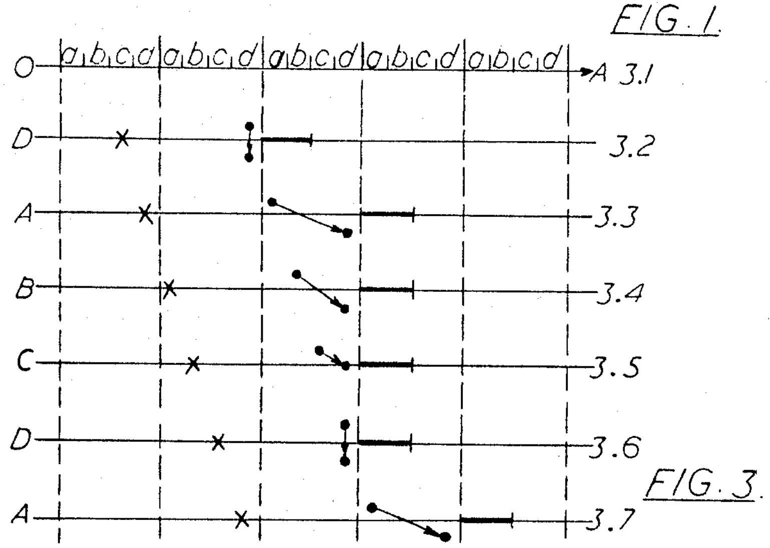
FIGURE 3 shows the dephasing between the exchange time and the trunk time.

These positions have been shown on FIGURE 3. Five consecutive digit time slots placed on an axis OA subdivided into basic time slots have been shown in 3.1, and the coincidence positions for which the present position information D, A, B, C have been respectively elaborated are shown in FIGURES 3.2 to 3.5. The direction OA is taken as the direction for increasing times, and a shift of the reference signal (shown by a cross on the figures) in this direction corresponds to an increasing time delay.

The present invention information A, B, C or D transmitted to the retiming unit 120 on the conductor 15 is used to read the message signal stored in the buffer store 130, respectively at the time *a*, *b*, *c*, or *d* and for applying this signal to the circuit 140 from which it is read at the time *d* of the same channel time slot.

The times at which the signals are applied to the circuit 140 have been represented on the FIGURES 3.2 to 3.7 by means of points located above the reference axis and the times *d* from which the signals become available on the output 11 by means of points located beneath the reference axis.

The circuit 130 delays the message signals applied to it by a fixed quantity with respect to their mean position, i.e. a message signal is transferred from the circuit 130 to the circuit 140 a given time interval after the reference signal which is associated to it (in the particular case considered, this time interval is equal to 5 basic time slots). Each message signal applied to the circuit 140 at a given basic time slot *a*, *b*, *c*, or *d* is extracted from this circuit during the basic time slot *d* so that the circuit 140 introduces a delay which varies from 3 to zero basic time slots when the condition A, B, C or D is found.

It will be assumed that, at a given moment, the condition A is found and it is seen, FIGURE 3.3, that the message signals are then delayed by 8 basic time slots. As long as no slow fluctuation takes place, one remains in the condition A. When, as in the case of the example, the message signal is affected by a slow fluctuation in the positive direction of time (delay) one will pass successively to the conditions B, C, D (FIGURES 3.4, 3.5, 3.6) and again to the condition A (FIGURE 3.7).

In practice, since the frequency of the slow fluctuation is very slow, one remains an appreciable number of digit time slots in each condition.

The passage from the condition A to the condition B corresponds to an increase of one basic time slot of the delay of the mean position of the message signal with respect to the exchange time, which is compensated by a decrease if one basic time slot of the delay introduced by the circuit 140.

The successive digit time slots at the exchange time will be referenced ($q$), ($q+1$), ($q+2$) etc. . . . and, for instance, the basic time slot *b* of the digit time slot ($q+1$) will be referenced $(q+1)b$.

Thus, two successive message signals applied to the circuit 130, to which correspond reference signals appearing respectively at the digit time slot $(q)a$, condition B and ($q+1$), condition C, are extracted from the circuit 140 respectively at the times $(q+1)d$ and $(q+2)d$, i.e. at two successive digit time slots. The same happens during the shift from the condition B to the condition C and from the condition C to the condition D. During the shift from the condition D to the condition A, i.e. when the delay has increased by one digit time slot, two successive message signals applied to the circuit 130 and corresponding to the reference signals appearing at times $(q)c$, condition D and $(q+1)d$, condition A, are extracted from the circuit 140 respectively at the times $(q+1)d$ and $(q+3)d$, i.e. if these signals are 1, the number 101 is obtained at the output of the circuit 140.

One understands easily that an error appears also during the shift from the condition A to the condition D and that two successive signals 11 corresponding respectively to the condition A and to the condition D will be transmitted at the output of the circuit 140 under the form 1. One understands that since the circuit 140 enables to compensate, but for a maximum delay of 3 basic time slots, when the delay reaches more than 3 basic time slots, it acts in order to compensate said delay with an approximation of one digit time slot.

Its action corresponds then to reset the message signal with one digit time slot delay, or, in other words, to show up the delay at the output only by discrete quantities each time it reaches one digit time slot. In relation with the detailed description, one will explain later on, how advantage is taken of the structure of the messages in order to avoid the losses of information during the shift from the condition D to the condition A and conversely.

If the condition existing previously is referenced A′, B′, C′, D′, an error will be thus detected when one of the couples of conditions D′ and A or A′ and D will be found.

It is thus seen that the retiming unit 120 corrects the effects of phase shifts lower than a digit time slot by carrying out at the suitable moments, corrections of one quarter of a digit time slot. But these corrections are no more sufficient when the phase shift reaches one digit time slot and the information delivered on the output 11 is erroneous and will not be stored in the address which corresponds to it in the data store 160.

The error will be corrected by acting on the advancing of the digit counter of said store.

When one shifts from the condition D′ (FIGURE 3.2) to the condition A (FIGURE 3.3) if per instance the store 130 delivered just before the shift a message signal W15.4, this signal is stored in the address V15.4′. If it delivers the signal W15.5 just before the shift, this signal is stored in the address V′15.6′ instead of being stored in the address V′15.5′. In order to avoid this error it will thus be necessary to stop before the modification of information has taken place, the advancing of the digit counter during a digit time slot: this will be called a "delay operation."

In the same channel, if one passes from the condition A′ to the condition D, it will be necessary to make the moment counter jump a position, and this will be called a "lead operation."

In order that these corrections do not disturb the value of the message registered in the data store 160, they are performed during the time of passage of the synchronization code which is not stored.

By referring to FIGURE 2, the present position information is obtained by comparing, in the block 280, the reference signal 14 delivered by the input unit 110 on the one hand with the exchange time delivered on the conductor 21 by the local clock 310 and on the other hand with the condition A′, B′, C′ or D′, or "old position information" which was stored in the retiming unit 120 and which is transmitted to this block 280 on the group of conductors 17.

This information is transmitted to the retiming unit 120 on the group of conductors 15 where it is used to control the duration of the delay brought by the circuit 140.

The comparison carried out, in the block 280, between the old position information and the present position information, enables to detect the presence of a couple of conditions A′ and D or D′ and A requiring to perform a lead or lag operation. This error information is characterized by the apparition of a signal on either one of the two output conductors 12*a* or 12*r* and of a signal on the output conductor 29. These three conductors are connected to the error correction unit 210 and the signal 29 sets therein a flip-flop R*o* in the 1 state.

The circuits of the error correction unit will be described further on.

All the operations performed in the block 280 are controlled by the programme I which lasts 3 channel time slots. When a programme is completed on a given trunk, one shifts to the following trunk, except if the flip-flop R*o* is in the 1 state.

The operations of pulse synchronization just described can deliver a valid result, only if the digit time slots of the normalized message signals appearing on the conductor 11 are perfectly synchronized with those shown up by the address counter of the data store 160, i.e. if the signal W1.1 appears for instance at the same time when the address V′1.1′ is selected in the memory.

In order to mark this synchronism, a synchronization code is transmitted on the channel number 25 of each trunk.

In order to check this synchronism and eventually for resetting it, provision has been made in the system according to the invention for a group of channel synchronization circuits, the operation of which is controlled by the programme III and which includes a block 230 which detects the coincidences and the non-coincidences and a block 250 which detects the synchronism.

The synchronization code is shown out permanently in this block 230 which receives, on its input 11, the normalized message signals delivered in time succession, by the unit 120. During the whole duration of application of an activation signal 23, these message signals are compared to the synchronization code, in such a channel as, when the message received during 8 successive digit time slots is identical to the code shown out, the block delivers a signal on its output 24 characterizing a "coincidence" between this message and the synchronization code.

If the signal 23 is sufficiently long, one is absolutely sure to obtain a signal 24 which appears at the moment W25.8. If care is taken that at the following digit time slot the address V′1.1 is selected in the data store 160, one will be sure to be in synchronism.

In practice, the programme III is organized in such a channel as to check first if the synchronization code arrives during the time where the addresses of the channel 25 are selected in the store.

For that, a signal 16 is transmitted from the data store 160 to the clock 310 when the address V′25.1′ is selected in said store. Starting from this moment, the clock supplies, on its output 25, a signal V25 which lasts 8 digit time slots, more accurately from V′25.1′*b* to V′25.8′*c*. This signal, after passage in the OR circuit 231 is utilized as an activation signal on the input 23 of the block 230. At the end of this signal V25, two cases may be considered:

A signal 24 appears characterizing a coincidence. This means that at the following digit time slot the address V′1.1 will be selected in the data store.

Since this single coincidence could have been produced by a disturbance in the transmission of the message signals, it will be admitted that it is necessary to obtain 3 successive coincidences for deciding that the conditions of synchronism are fulfilled.

A signal 24 does not appear which characterizes a non coincidence. For the same reasons as stated hereabove, it will be admitted that it is necessary to obtain 3 successive non-coincidences for deciding that the synchronism is lost.

This counting of 3 identical successive conditions is performed in the synchronism detection unit 250 to which is connected the conductor 24.

This block comprises, first, a storage element in which is registered, at the end of each time V25, the condition obtained by the comparison and, second, a four position counter, these positions being referenced 0″ to 3″, which counts the succession of identical conditions and which returns to position 1″ when two successive conditions are different.

When the "coincidence" condition is registered in the memory element and when the counter is in the position 3″ this means, as it has been admitted previously, that one is in the state of synchronism. When the condition "non coincidence" is registered and when one is in the position 3″ this means that the synchronism is lost. The conjunction of these two conditions induces the elaboration, in the block 250, of two signals 26 and 42*r*.

In other words it has just been checked three times that the signals W25.1 to W25.8 did not arrive at the moment where the addresses V′25.1′ to V′25.8 were selected in the memory. The first operation is initiated by the signal 26 and the second one is controlled by the signal 42*r*.

One is then in the operation conditions stated at the beginning of the study of the block 230. After a certain time, which is no longer than a frame period if the transmission is not disturbed, the appearance of the "coincidence" condition and its inscription in the memory element of the unit 250 characterizes the digit time slot W25.8 and cancels the signals 26 and 42*r*. The address counters are unblocked and, after a few digit time slots, they set up the synchronism during the message W1. The suppression of the signal 26 stops the free search, but at the end of the frame the code checking cycle described previously is initiated so that the synchronism is accepted only after three checks.

The minimum time of performance of a programme III is of 3 frames if only coincidences have been obtained.

When the operation of channel synchronization is completed on a trunk, one begins once again the operation on the following trunk unless the group of pulse synchronization circuits has already delivered in the meantime an error information which is memorized in the flip-flip Ro of the block 210, which initiates the programme II.

In this case, the error correction unit 210 delivers, on its output 28, a signal which is applied to the decoding block 330 and which controls the choice, by the selector 341, of the trunk on which an error correction must be performed.

The error information which is present on the conductor 12*a* or 12*r* is then transmitted through the block 210, to the data store 160 on one of the conductors 22*a* assigned to the lead operation, or 22*r* assigned to the lag operation. This transmission can be carried out, as it has been set up previously, only during the time of passage of the synchronization channel defined by the clock 310 (signal transmitted over the conductor 25).

For the performance of the lead operation, the signal appearing on the conductor 22*a* is applied to the data store in order to make its digit counter jump a position: as an example, if the lead order is given at the moment where the digit counter is in the position 3, it will jump at the following digit time slot to the position 5 instead of shifitng to the position 4.

For the performance of a lag operation, the signal appearing on the conductor 22*r* is applied through the OR circuit 226 to the store 160 in order that its digit counter remains on the same position during two consecutive digit time slots.

Thus, it is seen that the function of pulse synchronization and of channel synchronization which were defined before undertaking the study of FIGURE 2, are carried out through the blocks 120–280–210 and the blocks 230–250–210. The blocks 110, 310 and 330 deliver information used for the performance of these two functions. The input information is applied to terminal 10 and the output information appearing on terminal 11 is stored in the data store 160.

The different programmes which have been briefly studied are interconnected in the following channel:

The programme I controls the synchronization of the pulses on the trunk *p* selected by the decoder 331.

(a) If an error signal concerning the trunk *p* is detected, this latter is stored and initiates the programme II as soon as the programme III which is in course of operation on the selected trunk at this moment by the selector 341 is ended.

The programme II performs the correction of the pulse synchronization on the trunk *p*, after which the selector 341 selects the trunk $p+1$ for the performance of a programme III and the selector 331 selects the trunk $p+1$ and initiates once again a programme I.

(b) If no error signal relative to the trunk *p* is detected, the selector 331 shifts a step forwards.

(b1) The programme I is initiated up to the time when an error signal is obtained and when one returns back to the case (a).

(b2) During this time the selector 341 shifts forwards in an autonomous channel and the programme III is repetitively initiated for the performance of the channel synchronization operation as long as the programme I has not supplied an error signal.

It is thus seen that the selectors 331 and 341 operate in an independent channel, except when the correction of an error detected in the pulse synchronization circuit has to be performed. The trunk selector 331 selects all the trunks in the order 1 to *n*, but the selector 341 selects only the trunk which follows that on which a correction of channel synchronization has just been carried out, and, eventually the following trunks, if in the meantime, no correction of the pulse synchronization has been carried out.

It will be reminded that, on one trunk, an examination of the pulse synchronization lasts 3 channels (12 μs.) and an operation of channel synchronization lasts at least 3 repetition periods (300 μs.). An operation of correction of channel synchronization lasts a little more than one repetition period (100 μs.).

The operation of the device according to the invention whose circuits are detailed on the FIGURES 4 to 8 will be studied now in detail.

Figure 9:
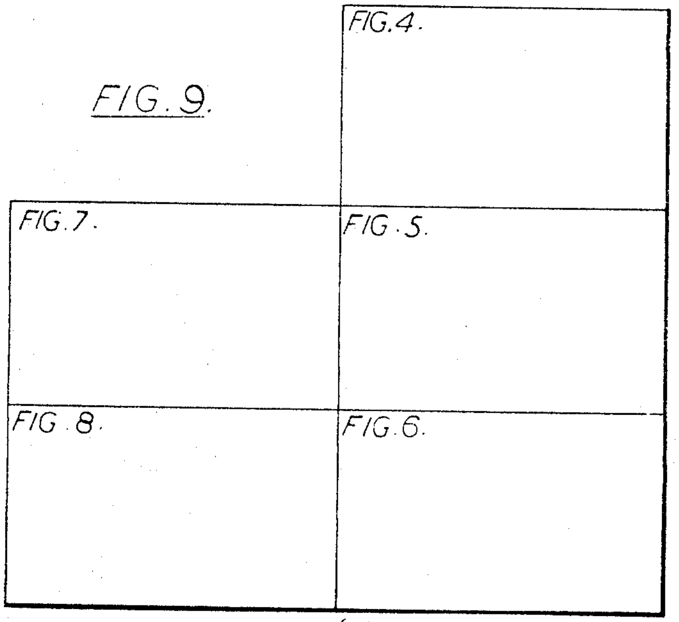
FIGURE 9 shows the assembly diagram of the FIGURES 4 to 8.

FIGURE 9 shows the assembly diagrams of these figures.

The operation of the blocks 110, 310 and 330 delivering information used in common for the performance of the functions of the pulse synchronization and of channel synchronization shall be first described.

Figure 8:
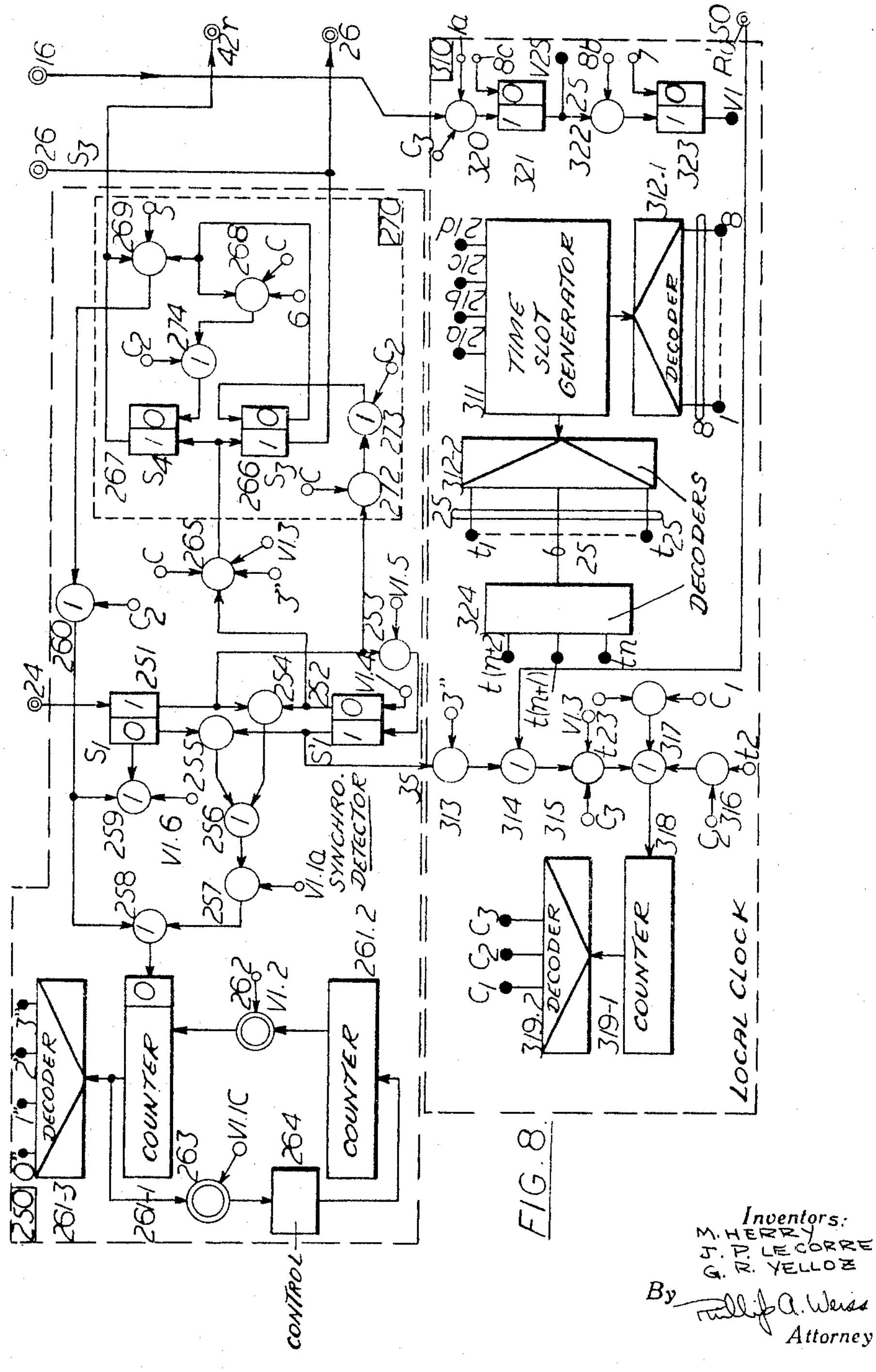
FIGURE 8 shows the detailed diagram of the central exchange clock and of the synchronism detection unit placed in the synchronization common circuit.

FIGURE 8 shows in particular, the detailed diagram of the local clock 310. This latter comprises first a time slot generator 311 which delivers the exchange time, the channel of achievement of which, well known to the man of the art, will not be described in detail.

This generator comprises two counters, the advance of which is controlled by a high stability oscillator and which show up, in time succession, the first one 3 digit codes of digit time slots 1 to 8 and the second one 5 digit codes of channel time slots $t1$ to $t25$.

Two decoders 312–1 and 312–2 comprising respectively 8 and 25 outputs are associated to these counters and deliver time signals used during the process of the operations.

In order to obtain a composite signal, for instance the signal $t$23.7 the channel time slot signal $t$23 and digit time slot number 7 are applied to an AND circuit which delivers a signal only during the time of their coincidence. For reasons of simplification, the elaboration circuits of these composite signals have not been represented on the figures.

Figure 6:
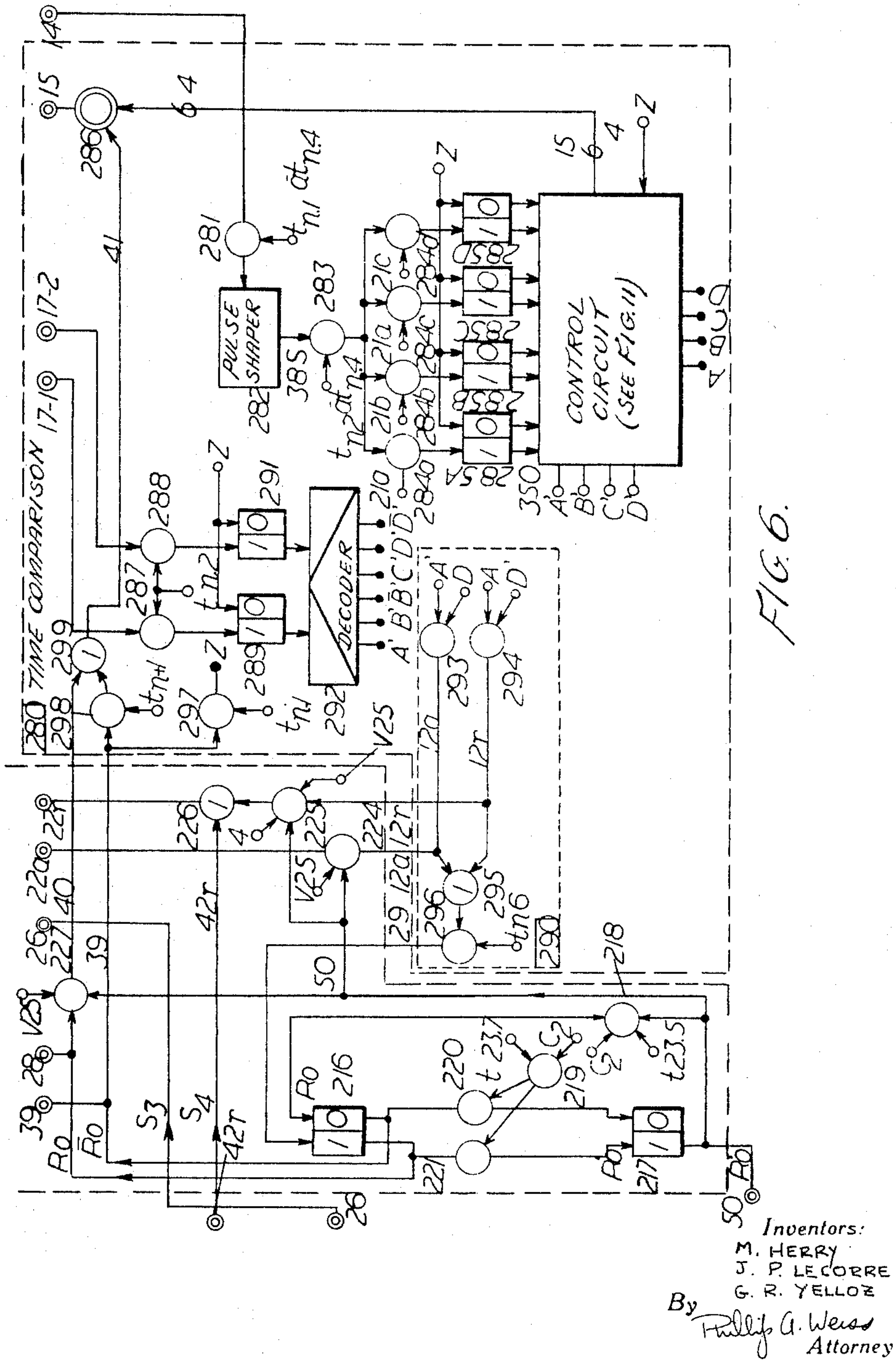
FIGURE 6 shows the detailed diagram of the comparison between the exchange time and the trunk time and of the correction control block placed in the common synchronization circuit.

It will be noted that a digit time slot signal delivered by the generator 311 will never be used alone in the course of the description, i.e. a reference of channel time slot signal will always be associated to it as for instance the signal $t$23.7 applied to the AND circuit 219 of FIGURE 6.

The generator 311 delivers also, on its outputs 21, the basic time slot signals *a, b, c, d,* characterized by the fact that the beginning of the signal *a* coincides with the beginning of a digit time slot signal.

An auxiliary logical circuit 312 to which are applied the signals $t1$ to $t25$ comprises a certain number of OR circuits and delivers signals $tn$, $t(n+1)$ and $t(n+2)$ such as:

$$tn=t1+t4+t7+t10+t13+t16+t19+t22$$
$$t(n+1)=t2+t5+t8+t11+t14+t17+t20+t23$$
$$t(n+2)=t3+t6+t9+t12+t15+t18+t21+t24$$

A second time circuit is constituted by the whole assembyl of the elements referenced 320 to 323 and it is controlled, first by applying a signal on conductor 16 when the channel counter of the data store 160 (FIGURES 2 and 4) is in position V'25, and second by the digit time slot signals delivered by an auxiliary digit counter 211 (FIGURE 5) placed in the common synchronization circuit.

The channel of the operation of this counter shall be described further on and it will be sufficient now to know that it is synchronized with the digit counter of the data store. The positions of the counter will be referenced 1 to 8 and the corresponding signals will be used alone or associated with signals referenced V25 and V1 (Example V1.1*a*) whereas the positions of the digit counter of the data store will be referenced 1' to 8' and the corresponding signals will only be associated with time position signals V'1 to V'25 (Example V'25.3').

The signal 16 is applied to an input of the AND circuit 310 which receives on its two other inputs a signal 1*a* characterizing the basic time slot *a* of the position 1 of the auxiliary digit counter 211 and a signal C3 which will be defined further on. The output of this AND circuit is connected to the flip-flop 321 in such a channel as this latter sets in the 1 state at the time V'25.1'*b* if it is admitted that the response time of the flip-flop is not longer than a basic time slot. The output of this flip-flop is applied to the AND circuit 322 which receives on a second input signal 8*b* so that said circuit delivers a signal from the time V'25.8*b* on.

The flip-flop 321 being reset to 0 at the time 8*c*, this latter thus remains in the 1 state only during a time interval comprised between V'25.1'*b* and V'25.8'*b*. This time slot will be referenced V25 and it will be available on the output 25.

The signal delivered by the AND circuit 322 is applied to the flip-flop 323 which sets to the 1 state at the time V'25.8'*c* and is reset to 0 at the first following digit time slot 7, i.e. the signal it delivers, which will be called V1, lasts from V'25.8*c* to V'1.6'*d*.

Last a third circuit is constituted by the elements 313 to 318 which control the advancing of a three position counter to which is associated a decoder 319–2 comprising the outputs: C1, C2, C3.

In this circuit, the elements 313, 316, 317 are two input AND circuits, the element 315 a three input AND circuit and the elements 314 and 318, OR circuits.

It will be assumed that the counter 319–1 is initially in C3. The signal appearing on the input 35 of the circuit 310, and which will be called S'1, is applied to the first input of AND circuit 313, the second input of which is connected to the output 3'' of the coincidence and non coincidence counter of the block 250, which has been mentioned during the study of FIGURE 2. When these two signals are simultaneously present, this AND circuit delivers a signal which is applied, through the OR circuit 314, to the first input of the AND circuit 315. The second input of this circuit receives, during the digit time slot 3, the signal V1 produced by the second time circuit and on its third input the signal C3. When these three signals coincide, this AND circuit delivers a signal which is applied, through the OR circuit 318, to the counter 319 which advances by one position and delivers a signal on output C1. This passage in C1 may also take place if the first input of the circuit 315 receives, through the OR circuit 314, a signal on the conductor 50, this latter signal being referenced R'0.

At the following time *t*23, the simultaneous application of this signal and of the signal C1 on the two inputs of the AND circuit 317 activates this latter and the signal delivered is applied, through the OR circuit 318 to the counter 319 which advances and shifts in position C2.

Last, at the following time T2, the simultaneous application of this signal and of signal C2 on the two inputs of AND circuit 316 activates this latter and the signal delivered is applied, through the OR circuit 318 to the counter 319 which advances to the position C3. The operations which are carried out in this third time circuit may also be represented by the following logical equations:

$$C1=C3\times V1.3\times(R'o+S'1)\times 3''$$
$$C2=C1\times t23$$
$$C3=C2\times t2$$

In order to simplify the figures, the connections between the time signal terminals of the clock and the different circuits have not been shown on the figures. As a general rule the output terminals of a circuit whereupon time signals appear are shown by a point and the utilization terminals of such signals are shown by a small circle.

Figure 7:
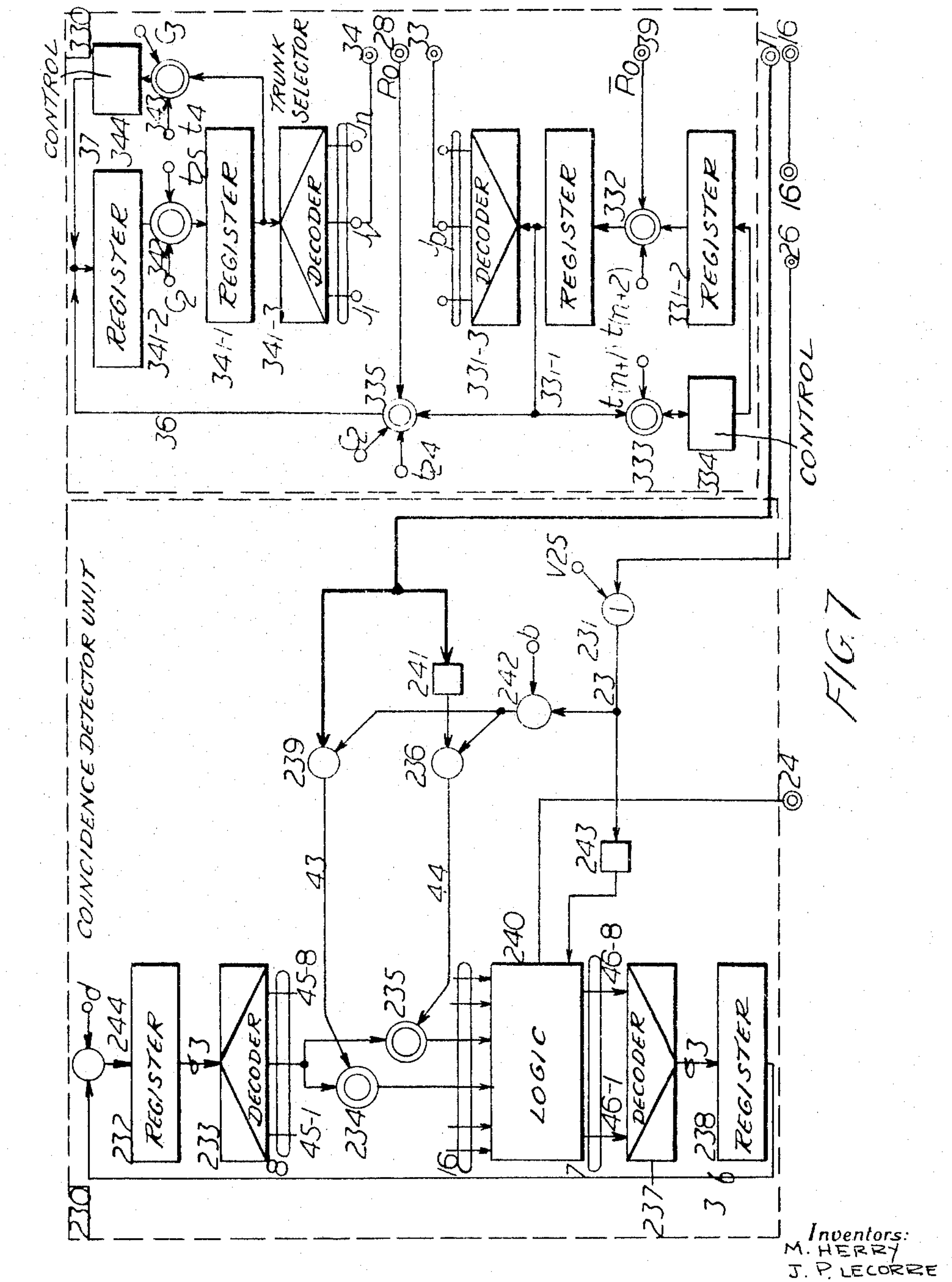
FIGURE 7 shows the detailed diagram of the coincidence detection block and of the trunk selector block placed in the common synchronization circuit.

FIGURE 7 comprises in particular, the detailed diagram of the block 330 of the trunk selectors, the functions of which have been briefly discussed during the study of FIGURE 2. It comprises two selectors 331 and 341 of identical structure each one comprising two registers 331–1, 331–2 and 341–1, 341–2, a decoder 331–3, 341–3 and a logical block 334 and 344. The two registers of each one of the selectors are connected by the two multiple AND circuits 332, 333 and 342, 343 and the two selectors are controlled through the simple AND circuit 335 comprising 4 inputs.

The channel of operation of one of these selectors, per instance that of selector 341, will be first described. The register 341–1 of showing out of trunk code comprises *q* flip-flops if the trunk code comprises *q* digit time slots. A decoder 341–3 is associated to it, said decoder comprising $n_1$ distinct output terminals *Jl . . . Jv . . . Jn* if one incoming trunk out of $n_1$ has to be selected. The register 341–2 comprises *q* flip-flops which are connected to the register 341–1 through the group of *q* AND circuits 342 so that when, for instance, the code of the trunk *v* is inscribed in this register the activation of the AND circuit 342 at the time *t*25 of the time C2 provokes the transfer in parallel form of code, this code in the register 341–1.

A signal appears then on the output 34*v* of the decoder 341–3 and the corresponding trunk is selected as it has been explained during the description of FIGURE 2. At the first time *t*4 of the following time C3 (it will be reminded that $C3=C2\times t2$) the AND circuit 343 is activated and the code of the trunk *v* is transmitted, in parallel form, to the logical block 344 which is designed in such a channel as to deliver, on its output 37, the code of the trunk *v*+1 which is stored directly, in the register 341–2.

In order to simplify the achievement of the logical block, a cyclic code is used.

In order to obtain the number immediately higher than a given number, a shift by one position of all the digits of the initial number towards the more significative positions is carried out. The more significant digit of the initial number is then lost and the logical block determines the digit, 0 or 1, which is the less significant digit of the new number.

The channel of achievement of such a logical block being well known to the man of the art a detailed description will not be made.

The selector 331 operates in the same channel: the code *p* stored in the register 331–1 is transferred to the logical block 334 and the code *p*+1 which is stored in the register 331–2 is transfered to the register 331–1 if the group of AND circuits 332 is activated by a signal $\overline{Ro}$ at the time $t(n+2)$. By referring again to the study of FIGURE 2, this signal $\overline{Ro}$ is delivered by the flip-flop placed in the error correction unit 210 when it is the 0 state control of the corrections. Since the passage to the 1 state of this flip-flop means that the pulse synchronization circuit has detected an error it will be represented by the condition R*o*.

If the condition R*o* exists at the times C2 and *t*24, the AND circuit 335 is activated and the code of trunk *p* stored in the register 331–1 is transferred in the register 341–2, wherein it replaces the trunk code *v* which was previously stored. The operation of these selectors enables the choice between the programmes as it has been defined at the end of the study of FIGURE 2; the selectors 331 and 341 operate independently except when a correction of the error detected by the pulse synchronization circuit has to be performed. This operation is characterized by the condition R*o* which enables the transfer of the trunk code *p* on which an error exists the selector 341 which controls the connection to the common circuit, of the circuits of this trunk, so that the correction can be made. If no error has been detected on the trunk *p*, one has the condition $\overline{R}$ which blocks the advancing of the selector 331 and the programme I for the detection of pulse synchronization error is repeated until the condition R*o* appears.

TABLE I

| 1 | 2 | 3 | 4 | 5 |
|---|---|---|---|---|
| | | | | Programme IV—Common part. |
| 1 | | $t(n+1)$ | | Transfer of the code of the trunk No. $p-1$ in the logical block 334 and selection of the trunk No. $p$ by the selector 331 (AND circuit 333). |
| | | | | Programme IV*a*. |
| | | | | Condition $\overline{Ro}$: No error correction on the trunk No. $p-1$. |
| 2 | | $t(n+2)$ | $t(n+2)\times\overline{Ro}$ | Transfer of the code of the trunk No. $p$ to the selector 331 (AND circuit 332). Trunk No. $p$ is selected for the execution of a programme I. |
| 3 | C3 | $t4$ | $C3\times t4$ | Transfer of the code of the trunk No. $v-1$ in the logical block 344 and selection of the trunk No. $v$ by the selectior 341 (AND circuit 343). |
| 4 | C2 | $t25$ | $C2\times t25$ | Transfer of the code of the trunk No. $v$ in the register 341-1 (AND circuit 342). The trunk No. $v$ is selected for the execution of a programme III. |
| | | | | Programme IV*b*. |
| | | | | Condition Ro: An error correction must be performed on the trunk No. $p-1$. |
| 5 | | $t(n+2)$ | $t(n+2)\times Ro$ | No transfer. A new programme I will be performed on the trunk No. $p-1$. |
| 6 | C2 | $t24$ | $C2\times t24\times Ro$ | Transfer of the code of the trunk No. $p-1$ in the register 341-2 (AND circuit 335). |
| 7 | C2 | $t25$ | $C2\times t25$ | Same operation that in IV*a*-4, but it is now the trunk No. $p-1$ which is selected for the execution of a programme II. |
| 8 | C3 | $t4$ | $C3\times t4$ | Same operation that in IV*a*-3, but it is now the code of the trunk No. $p$ which is stored in register 341-2. |

As it has been explained during the study of FIGURE 2, the two selectors operate independently except when a correction of the error detected by the circuit of the pulse synchronization has to be performed, this error being characterized by the condition R*o*. The operation of these selectors is also controlled by a programme which will be called programme IV and which is detailed in Table I.

This table is presented in the following manner: column 1 shows the number of reference of each one of the operations, column 2 the time signal C1, C2 or C3 delivered by the local clock 310 and which controls some of the operations, column 3 the time at which the operation under consideration is carried out, column 4 a symbolic representation of the conditions necessary for the performance of the corresponding operation of column 5 the detail of the operation performed. This programme IV is divided into two sub-programmes having the reference IV*a* and IV*b* according to which of the conditions $\overline{RO}$ or R*o* is present.

This table does not show the times of switching of the conditions C1, C2, C3 which have been detailed during the study of the local clock 310. The operations for which no indication is given in column 2, are those which develop independently of the time signals C1, C2, C3. This programme shows up clearly the fact that, after the performance of a programme II on the trunk $p-1$, the programme III which follows is performed on the following trunk $p$. In the following description a given operation of this programme will bear for instance the reference IV*a*–4 if it corresponds to that shown on line 4 (column 1).

Figure 4:
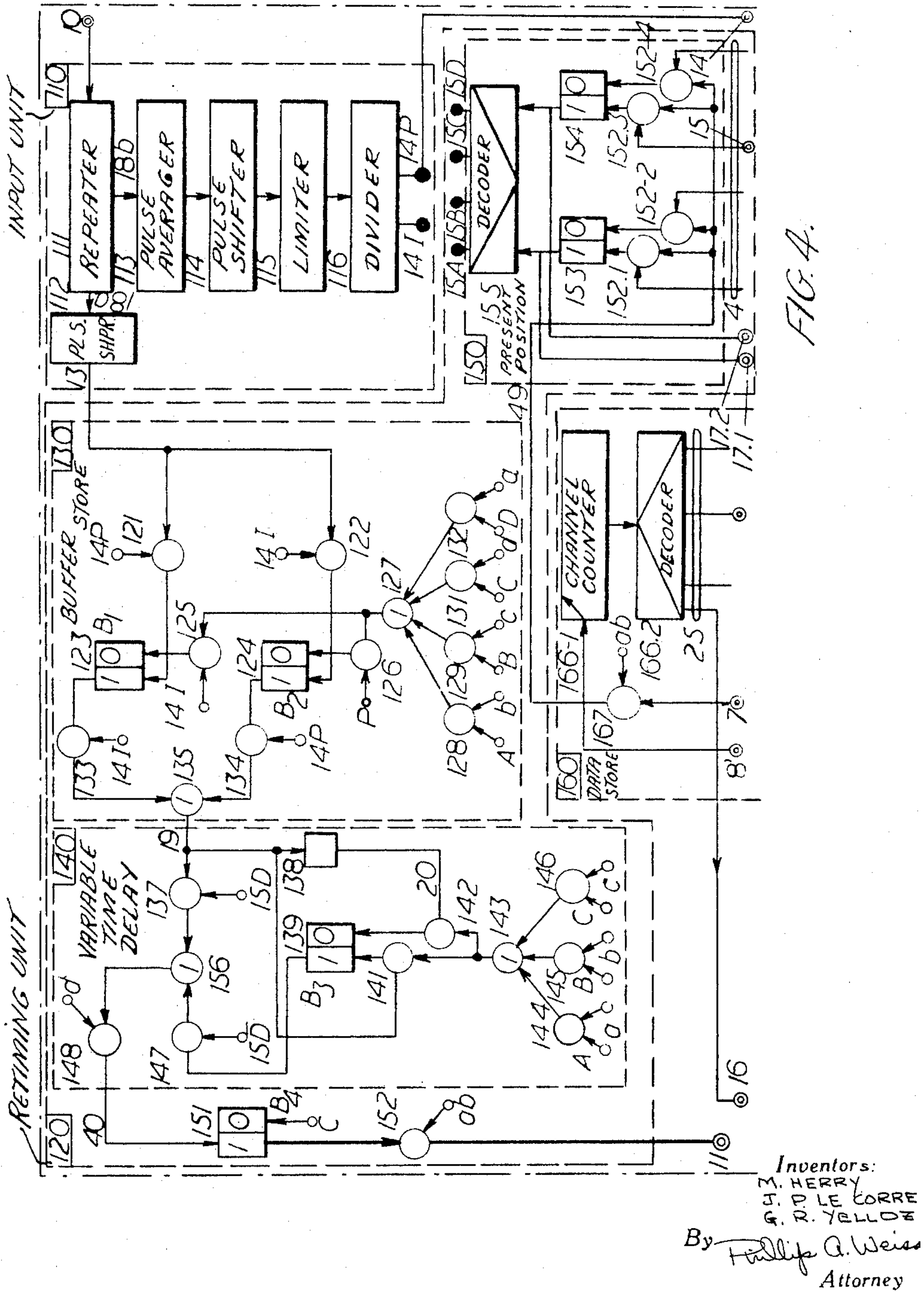
FIGURE 4 shows the detailed diagram of part of the elements of an incoming trunk circuit.

FIGURE 4 comprises in particular the detailed diagram of the input unit 110. Since this unit belongs to the trunk circuit 100 related to the trunk J1, it receives on its input 10 the message signals coming from the transmitting exchange. It comprises a repeater 111, a pulse shaper 112, a phase averaging circuit 113, a phase shifter 114, a limiter 115, and a divider 116, and its operation shall be described in relation with FIGURE 10 which represents the signal diagrams appearing in different points of this unit.

The repeater 111 of a well known type in the pulse code modulation technique delivers at each apparition of a message signal on the input 10, a regenerated message signal having a duration of 250 ns. on its outputs 18*a* and 18*b* which lasts thus half of a digit time slot. This signal 18 is applied, first, to the pulse shaper 112, which delivers on its output 13 a normalized message signal having a duration of 100 ns. and on the other hand, to the tuned circuit 113 which acts as a phase averaging circuit and delivers a sinusoidal signal in phase with the signal 18.

FIGURE 10*a* shows the mean position of some regenerated message signals 18 and on the FIGURE 10*b* the normalized message signals M1, M2, M3 etc. . . . elaborated from the former signals, in the pulse shaping circuit 112. The signals shown in thick line represent digits 1 and that shown in dotted line a digit 0.

The signals 18*b* are applied to the phase averaging circuit 113, tuned on the rated repetition frequency of the pulses appearing at the input of the trunk. When this circuit is energized by the signals 18*b*, it delivers a sinusoidal signal at this same frequency the positive half periods of which have been shown symbolically on FIGURE 10*c*, by a segment of line of a duration equal to half that of a digit time slot. This sinusoidal signal is applied to the phase shifter 114 (FIGURE 10*d*) then to the limiter 115 which delivers rectangular signals as shown on FIGURE 10*e*. Last, these signals are applied to the divider 116 which delivers on its outputs 14P and 14I signals shown respectively FIGURE 10*f* and 10*h* the repetition frequency of which is half the rated repetition frequency of the pulses.

Figure 10:
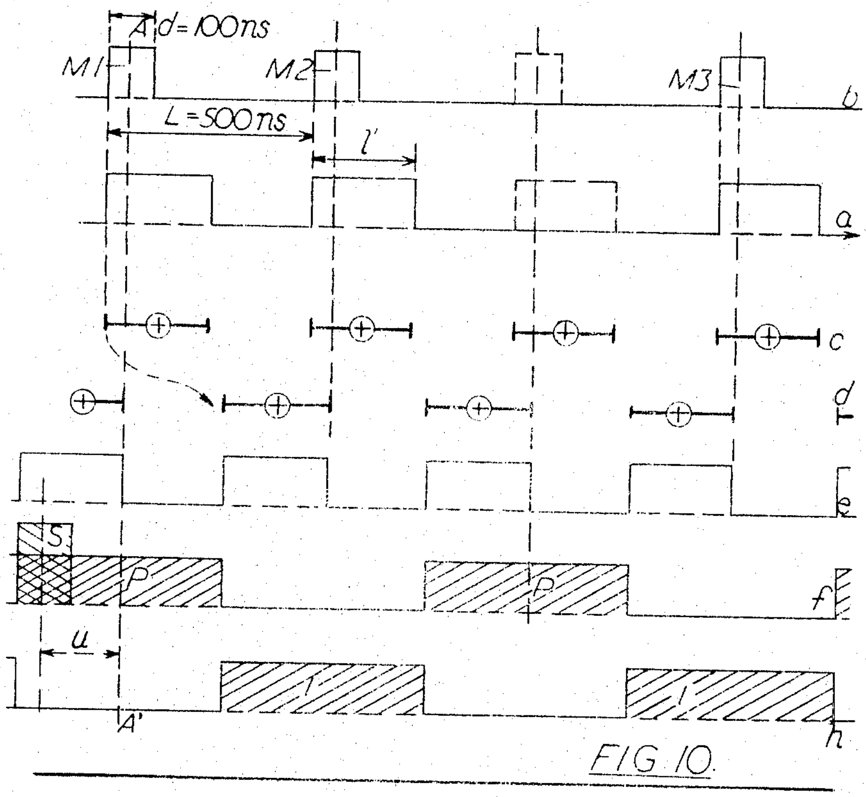
FIGURE 10 shows the diagrams of the signals appearing in different points of the block 110.

The delay introduced by the circuit 114 is chosen such as the signals 14P and 14I are perfectly centred with respect to the signal 13 delivered by the pulse shaper 112, this being represented on the FIGURE 10 by the line AA′ connecting the middle of the mean position of the first signal of FIGURE 10*b* to the middle of the first signal 14P of FIGURE 10*f*.

As it may be seen on FIGURES 10*f* and 10*h*, a signal P and a signal I appear each one every two digit time slots and are delayed by one digit time slot. Therefore a signal I will appear for instance at the odd digit time slots and a signal P at the even digit time slots. These signals 14P and 14I will be utilized further on for retiming the message signals and the signal 14P as a reference signal of the trunk time.

After study of the operation of the blocks 110, 310 and 330 delivering information used for the performance of the three programmes, the operations of the blocks 120 and 280 which perform the programme I related to the pulse synchronization shall now be described.

During the study of the local clock 310, it has been seen that the circuit 312 delivered, in time succession, channel time slot signals $tn$, $t(n+1)$ and $t(n+2)$. These three signals define the duration of a programme I.

When the code of the trunk $p$ is stored in the selector 331 (FIGURE 7), this trunk is connected to the common circuit through the AND circuits 102, 103, 104 and 108 (FIGURE 5) and a signal appears in particular on the first input of the AND circuit 102. The second input of this circuit is connected to the conductor 14P which transmits each second the signal P elaborated by the unit 110, which has just been described.

As it has been briefly stated during the study of FIGURE 2, a measure of the phase angle between the trunk time and the exchange time is carried out in the block 280.

FIGURE 6 comprises in particular the detailed diagram of this block 280. The signal transmitted by the AND circuit 102 on the conductor 14P is applied, in this block 280, to a pulse shaper 282 during the digit time slots $tn.1$ to $tn.4$. This time interval is established by the AND circuit 281 and enables to define a time interval during which at least one signal P appears and at most two of these signals. The pulse shaper 282 delivers on its output 38S a reference signal S the leading edge of which coincides with the leading edge of the signal P. This signal S will be transmitted to the first input of the AND circuits 284 to 287 during the times of $tn.2$ to $tn.4$, this time interval being established by the AND circuit 283. The signal S has a duration equal to that of a basic time slot *a, b, c* or *d*, i.e. 125 ns. The signal has been represented on the FIGURE 10*f* and it is seen that it presents a negative phase angle $\mu$ (leading) of 1.5 basic time slots, with respect to the mean position of the message signal M1 of FIGURE 10*b* associated to the same channel time slot P.

It is applied to the first input of the group of 4 AND circuits 284 the outputs of which control the setting to the 1 state of the flip-flops 285A to 285D which are associated to it. The second inputs of these AND circuits receive respectively the basic time slot signals *a, b, c, d*, so that, during the application of a signal S to this circuit, one can only have either one of these flip-flops or two adjacent flip-flops which set to the 1 state (one considers that the flip-flops 285A and 285D are adjacent) since said signal S can only coincide with a basic time slot or overlap two adjacent basic time slots. The outputs of these flip-flops are connected to the logical block 350.

Figure 11:
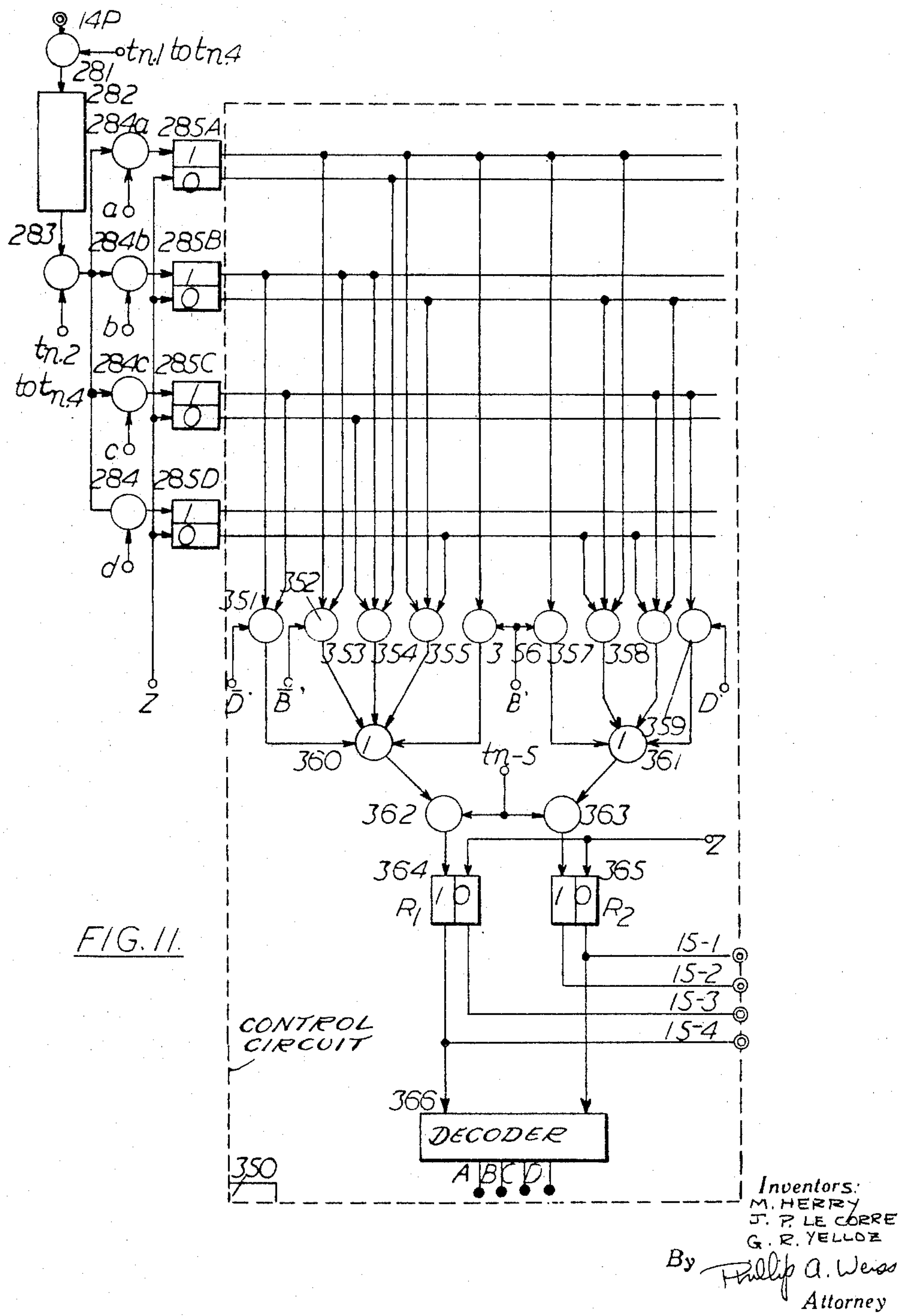
FIGURE 11 shows the detailed diagram of the logic block 350.

FIGURE 11 shows the detailed diagram of this logical block 350 on which the elements 285A to 285D already described, have also been represented.

It will be reminded that, as it has been discussed during the study of FIGURE 2, the block of comparison 280 elaborates during the performance of a programme I, a present position information characterizing the position of the message signal with respect to the basic time slot signals delivered by the local clock. This information is stored in a circuit, which is placed in the retiming unit 120 and, during the performance of the following programme I, it is sent back to the block 280 and constitutes the old position information.

In order to determine the functions which must be fulfilled by the logical block 350 one will consider first the case where one of the flip-flops 285A to 285D is in the 1 state and set that:

If the signal S coincides with the basic time slot signal *a*, the condition B is chosen.

If the signal S coincides with the basic time slot signal *b*, the condition C is chosen . . . etc.

When the signal S overlaps two adjacent basic time slots, it is necessary to make a choice between the two conditions to which this position may correspond: thus if the signal S overlaps the two basic time slots *b* and *c*, one has to choose between the two conditions C and D materialized by the setting in the 1 state of both the flip-flops 285 C and D. This choice shall be carried out in accordance with the following criterian: to reduce to the minimum the change of conditions between the performance of the considered programme I and that of the following programme I, the old position information will be used according to the following rules:

If the signal S coincides with the basic time slots *d* and *a* and if one has A′, A is chosen.

If the signal S coincides with the basic time slots *d* and *a* and if one has B′, B is chosen.

If the signal S coincides with the basic time slots *a* and *b* and if one has B′, B is chosen.

If the signal S coincides with the basic time slots *a* and *b* and if one has C′, C is chosen . . . etc.

The logical conditions just established are summed up in the columns 1 and 2 of the Table I which will be described in detail during the study of the retiming unit 120 and the operations to which they correspond are performed in the block 350 of the FIGURE 11. This block comprises the AND circuits 351 to 359 and 362, 363, the OR circuits 360 and 361, the flip-flops 364 and 365 which store the present position information A, B, C or D in a binary form, the 4 output decoding matrix 366 and the input terminals A′, B′, C′ and D′ on one of which is shown out old position information.

It has been seen previously that the signal S was available from $tn.2$ to $tn.4$. At the time $tn.5$, the signals delivered by the OR circuits 360 and 361 are applied to the flip-flops 364 and 365 in which the condition A, B, C or D is registered in binary form. This information is transmitted, first to the retiming unit 120 on the group of conductors 15–1 to 15–4 and, second, to the decoding matrix 366 wherein the output conductor corresponding to the signal A, B, C or D which has just been elaborated is selected.

FIGURE 4 comprises, in particular, the detailed diagram of the circuit 150 wherein the present position information is stored, this circuit being part of the retiming unit 120.

It comprises the group of AND circuits 152–1 to 152–4 which controls the writing, in the flip-flops 153 and 154, of the present position information sent from the block 280 on the group of conductors 15. This information is made available when a signal is applied on the input 41 of the multiple AND circuit 286 of FIGURE 6, the second input of this multiple circuit being connected to the group of outputs 15 of the logical circuit 350.

The signal 41 is delivered by the OR circuit 299 for a duration of at least one channel time slot. For the time being, only the case where no error correction has been shown up will be considered, i.e. when the flip-flop 216, referenced R*o* is in the 0 state. The signal 41 is transmitted during the channel time slot $t(n+1)$ through the AND circuit 298.

The AND circuits 152 are activated when a signal is applied to their common input 49. This signal is delivered by the digit counter of the data store 160 and corresponds to the basic time slots *a* and *b* during which the digit counter of said store remains on the position 7′. The present position information will thus be transmitted during a time interval, which may be written in logical notation:

$$t(n+1)\times 7'\times ab$$

The signals delivered by one or several of these AND circuits 152 are applied to the flip-flops 153 and 154 and one of the outputs A, B, C or D of the decoder 155 is selected. The present position information which is stored therein at the channel time slot $t(n+1)$ is used to carry out the retiming operations in the circuits 130 and 140 of the retiming unit 120.

The reasons for which the writing of the new present position information in the circuit 120 is carried out at the time slot $7'ab$ will be explained during the description of the circuits.

Coming back to FIGURE 6, the old position information stored in the circuit 150 (FIGURE 4), is sent back, in binary form, to the block 280 on the conductors 17–1 and 17–2 and it is stored in the flip-flops 289 and 291 at the time slot *tn*.2 set up by the AND circuits 287 and 288. The outputs of these flip-flops are connected to the decoder 292, the output of which corresponding to the old position information is selected.

FIGURE 4 comprises in particular, the detailed diagram of the circuits 130 and 140 placed in the retiming unit 120 associated with the trunk 100.

As it has been seen during the study of FIGURE 2, the function of this block is to perform the conversion of the trunk time into the exchange time and to delay, thanks to the present position information elaborated in the block 280, each message signal applied on its input 13 by a determined amount so that the signal is available at the basic time slots *a* and *b* for its inscription in the data store 160.

It has been seen, during the study of FIGURE 10, that the input unit 110 delivered on its outputs 14, reference signals P and I of a duration of one digit time slot, and which took place alternatively, each second digit time slot. These signals are used in the buffer store 130 for registering alternatively the message signals, which appear on the conductor 13 (AND circuits 121 and 122). This writing is made respectively on the flip-flops 123 and 124 assigned the first one to the time P the second one to the time I. The circuit is designed so that the information stored in such a channel should be available for reading, on the conductor 19, respectively at the time I and at the following time P (AND circuits 133 and 134). The information available on the conductor 19 is transferred to the time delay circuit 140 at a basic time slot, depending from the present position information and it is whether registered or not in the flip-flop 139 in order that it may be sent, on the conductor 40, to the flip-flop 151 at the basic time slot *d*.

The information recorded in the flip-flop 151 is then available at the times *a* and *b* delimited by the AND circuit 152 for the inscription in the data store 160, the time *c* being assigned to the reset to the 0 state of this flip-flop. The switching of the signals applied in 13 alternatively on one or the other of the flip-flops of circuit 130 enables to increase to the maximum the amplitude of the permissible fast fluctuations.

Before going on in the description of the circuit, one will determine the maximum permissible amplitude of the fast fluctuations for a correct operation of circuit 130 which carries out the shifting from the trunk time to the exchange time.

Figure 12:
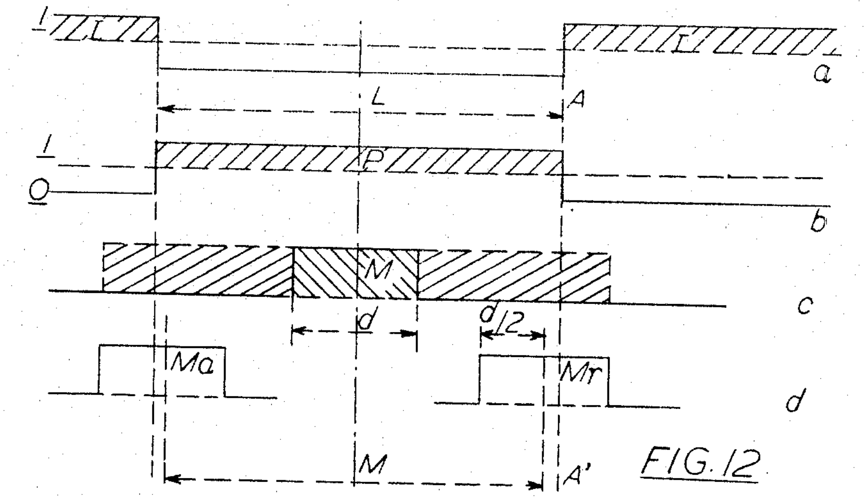
FIGURE 12 shows the diagrams of the signals used in the study of the admissible fast fluctuations.

FIGURE 12 shows the diagrams of the signals.

The state, at a given moment, of the flip-flops 124 and 123 has been represented in 12*a* and 12*b*, by admitting that a succession of digits 1 are received. The 1 and 0 states are shown on the figure, the 1 state being characterized by a positive voltage with respect to the reference level and the 0 state by a negative voltage.

FIGURE 12*c* shows a normalized message signal M of a duration $d=100$ ns. which since it has appeared during a digit time slot P, is registered in the flip-flop 123 which sets thus to the 1 state as shown on FIGURE 12*b*. The hatched parts framed by an interrupted line represent, on the FIGURE 12*c*, the area covered by this signal when it moves under the effect of first fluctuations. Theoretically, the mean position of this signal is perfectly centered with respect to the signal P thanks to the phase delay brought by the circuit 114 of the input unit 110.

FIGURE 12*d* shows the two extreme positions corresponding to the permissible fluctuation on the instantaneous position of this signal beyond which it would register in an erroneous channel in the flip-flop 124 inducing an error of one digit time slot either leading of lagging.

Let us call *trx* and *trn* the maximum and minimum times of the flip-flops 123 and 124, which define the dispersion $\Delta tr$ of these elements due to manufacture: $\Delta tr=trx-trn$. By considering the signal M*r* which overlaps the vertical line AA′ defining the end of the energizing time of the AND circuit 121, the limit conditions for correct registering may be written:

$$d-trn<trn \text{ thus } d<trx+trn$$

By setting $do=trx+trn$ one has $d<do$.

Let us call L the duration of one digit time slot and *m* the maximum permissible amplitude of fast fluctuations defined by taking, as extreme points, the middle of the signals M*a* and M*r*, one may write:

$$m=L-2(trx-d/2)=L-2trx+d \qquad (1)$$

By setting at the limit $d=do$ and replacing this value in Equation 1 one obtains a maximum amplitude *mo* of fluctuations under which the inscription is carried out in a correct channel:

$$mo=L-(trx-trn)=L-\Delta tr$$

$\Delta tr$ being low with respect to L, the maximum permissible amplitude of rapid fluctuations is thus slightly different from one digit time slot.

The operations performed in the circuits 130 and 140 are controlled by the signals P and I, by the basic time slot signals transmitted from the common synchronization circuit through the group of AND circuits 108 (FIGURE 5) and by the present position information available on one of the outputs 15A to 15D of the decoder 155 (FIGURE 4).

One has determined, during the study of the block 280 (FIGURE 6) the criteria for the choice of the present position information which is obtained by comparing the reference signal S with the basic time slot signals. The corresponding conditions have been summed up in the columns 1, 2 and 3 of Table II, in which have been given respectively the coincidence times of the signal S with one or two basic time slot signals, the old position condition and the present position condition which have been deducted therefrom.

Figure 13:
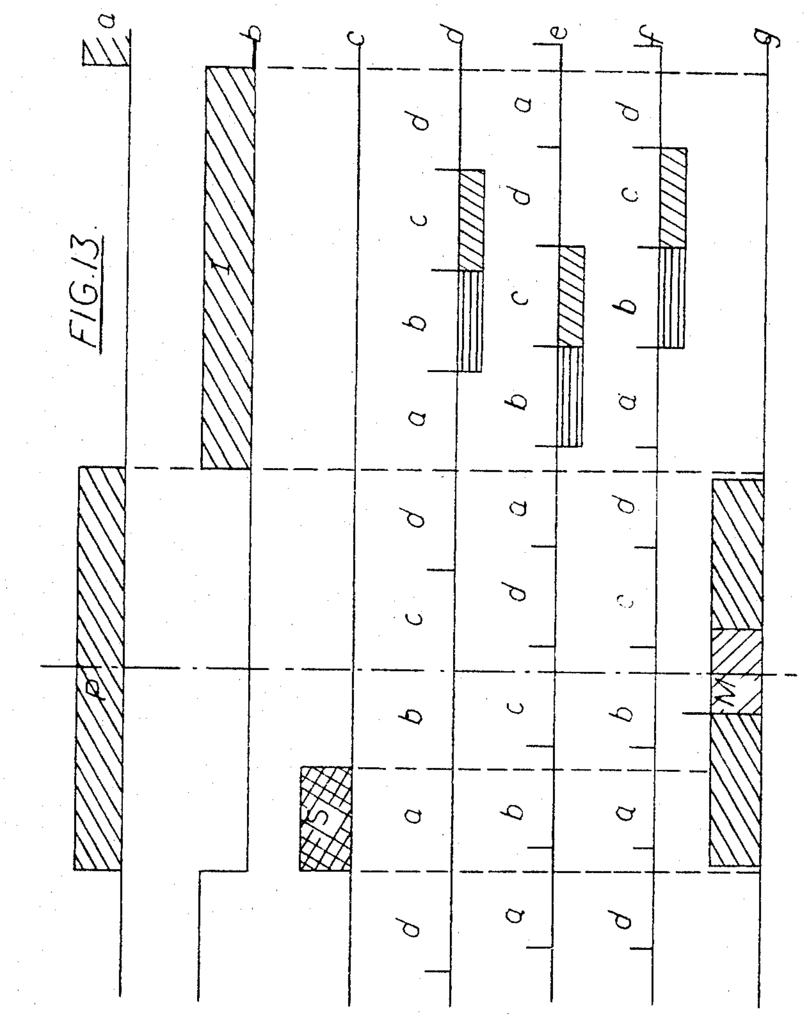
FIGURE 13 shows the diagrams of the signals concerning the establishment of the present position information.

As an example, the conditions of the line 1 of this table have been given explicitly in the diagrams of signals of the FIGURE 13, FIGURES 13*a* and 13*b* show two digit time slot signals P and I in time succession and FIGURE 13*c* shows the reference signal S the comparison of which with the exchange time has enabled the elaboration of a present position information B. It is admitted that the message signal, shown on FIGURE 13*g* with its maximum permissible rapid fluctuation, occurs during the digit time slot P and registers thus in the flip-flop 123. It can be seen, from FIGURE 4, that this flip-flop is read at the following digit time slot I, delimited through the AND circuit 133.

The three coincidence positions of the line 1 of Table II have been shown respectively FIGURES 13*f*, 13*d* and 13*e*. It is seen, by comparing these three figures, that the first basic time slot common to the three positions and wholly located in the digit time slot I reserved to reading is the time *b*. This time will be chosen for the reading and this has been shown, on three figures, by a rectangle of a duration *b* hatched by horizontal lines.

TABLE II

| | 1 | 2 | 3 | 4 | 5 | 6 |
|---|---|---|---|---|---|---|
| I | da<br>a<br>ab | B′<br>B′ | B | b | c | 2 |
| II | ab<br>b<br>bc | C′<br>C′ | C | c | d | 1 |
| III | bc<br>c<br>cd | D′<br>D′ | D | d | a | 0 |
| IV | cd<br>d<br>da | A′<br>A′ | A | a | b | 3 |

By applying the same reasoning to the lines II, III and IV, the reading conditions in these 3 cases may be deducted, these conditions being reported in the column 4 of Table I. When the information is read, and referring once again to the example of FIGURE 13, the flip-flop may be reset to the 0 state at the basic time slot following the reading, i.e. at the time slot *c* as indicated in column 5 and shown on FIGURES 13*d*, 13*e*, 13*f* by the rectangles hatched obliquely, this basic time slot *e* coinciding also with the digit time slot I. The choice of the time of reset to zero is carried out in the same channel for the lines II, III and IV as indicated in the column 5 of Table II.

Thus signals used for this reset to zero are delivered by the logical circuits 127 to 132 of the circuit 130 and their switching between the flip-flops 123 and 124 is carried out respectively at the time I and at the time P delimited by the AND circuits 125 and 126.

Referring once again to FIGURE 13, it is seen that the delay imposed by the circuit 130 to the message signal supposed to be placed at its mean position is at most of 3 full basic time slots, as indicated in column 6 of Table II. On FIGURE 13, the digit time slot P during which the determination of the present position information is carried out has been supposed to be the same as the digit time slot P during which the registering of the message signal M is carried out. In fact, the signal P which is used between the times *tn*.2 to *tn*.4 (see description of the block 280) has occurred before the times of registering and of reading at least two channel time slots before, but since its channel time slot is modified only according to the slow fluctuation, it can be admitted that it does not vary substantially during the whole time of utilization of the present position information, the elaboration of which was possible thanks to said signal.

The process of the operations which are performed in the circuit 140, the object of which is to enable the registering of all the message signals, whatever be their present position condition, in the flip-flop 151 at the same basic time slot will now be described. As a non-limitative example, it has been admitted that this registering was carried out at the basic time slot *d*.

As a first example, a message signal will be studied which is stored in the flip-flop 123 with a present position condition D. As indicated in column 3 of Table II, the reading will be made at the time *d* and therefore the message signal reset in position will be registered without delay in the flip-flop 151 as indicated in column 5 of Table II (in column 5, the delays brought by the circuit 140 have been measured by taking as unity a basic time slot).

The state of the flip-flop 123 is transmitted, at the time I reserved to the reading, through the AND circuit 133 and the OR circuit 135, to the AND circuit 137 energized by the condition D and it is finally applied through the OR circuit 156 to the flip-flop 151 at the basic time slot *d* delimited through the AND circuit 148. This flip-flop will thus be in the 1 state before the end of this time *d*.

On the contrary, the information read in *a*, *b* or *c* should be delayed by 3, 2 or 1 basic time slots, as indicated in column 5 of Table II; this will be performed by means of the flip-flop 139 and of the logical circuits 138 and 141 to 146.

As a second example, one will examine the case when the information must be read at the basic time slot *a* and corresponds to the condition A. The state of that of the flip-flops 123 or 124 which is in the 1 state, is transmitted through the OR circuit 135, on the one hand directly to the first input of AND circuit 141 and on the other hand, after an inversion in the circuit 138, to the first input of the AND circuit 142. The second input of these AND circuits receives, through the OR circuit 143, signals characterizing the couple of condition A and *a* delivered by the AND circuit 144, or B and *b* delivered by the circuit 145 or C and *c* delivered by the circuit 146.

In the considered example, when the signal delivered by the AND circuit 144 and the OR circuit 143 (condition A and time *a*), is applied on the second input of the AND circuit 141 which receives from another side the signal delivered by the OR circuit 135, the flip-flop 139 sets to the 1 state. This state is transmitted to the AND circuit 148 through the AND circuit 147 which is conducting for the condition $\overline{D}$ (i.e. for all other conditions except D, which is the case in the example considered) and the OR circuit 156. The AND circuit 148 becomes conductive at the time *d* for the inscription in the flip-flop 151.

This circuit operates in a similar channel when one has the conditions B or C.

The process of the setting of the flip-flop 139 to the 1 state has just been described.

The input 0 of this flip-flop is connected to the output of the AND circuit 142, which receives in the considered example a first activation signal for the coincidence A and *a* and a second activation signal on the conductor 20 which is the complement of that appearing on the conductor 19.

FIGURE 14 shows the diagrams of the signals related to the example considered, thanks to which it will be possible to sum up the operation of the circuits 130 and 140, and at the same time to show the conditions of the resetting to the 0 state of the flip-flop 139.

FIGURES 14*a* and 14*b* are equivalent to the FIGURES 13*a*, 13*b* and 13*c*.

The present position information A is obtained, in this example, by the coincidence of the signal S, FIGURE 14*a*, with the basic time slot signals *c* and *d* shown on the FIGURES 14*c* (Table II, first line of the line IV). The rectangles placed under the basic time slots *a* and *b* and referenced L123, Z123, L124, Z124 show the reading times and the times of reset to zero of the flip-flops 123 and 124 which take place respectively at the times of weight I and P. FIGURES 14*d* and 14*j* show the different signals existing in the circuits 130 and 140 when the number M1 M2 $\overline{M3}$ M4 $\overline{M5 \ldots Mn}$=11010 . . . 0 is applied on the input 13, the most significant digit being the first one.

FIGURES 14*d* and 14*e* show the state of the flip-flops 123 and 124, the 1 state being represented by a positive signal and the 0 state by a negative signal with respect to the axis of reference.

FIGURE 14*f* shows the signals delivered by the OR circuit 135 and applied by the conductors 19 and 20 respectively on the first input of the first AND circuits 141 and 142.

The existence of a signal on the conductor 19, has been shown symbolically on the FIGURE 14*f*, by a signal placed above the axis of reference and the existence of a signal on the conductor 20 by a signal placed under the said axis.

The numerals surrounded by a circle placed between the FIGURES 14*a* and 14*b* characterize the particular times in the operation which will be studied hereafter. The time arrival of the signals M1, M2 and M4 (digits 1) are shown, FIGURES 14*d* and 14*e*, by rectangular signals of a duration slightly lower than one basic time slot and it has been assumed that these signals did occupy their mean position in the digit time slots which were assigned to them.

The setting time of the flip-flops 123, 124 is slightly delayed with respect to the leading edge of the message signals owing to the time of response of the said flip-flops. At the time 1, the flip-flops 123 and 124 are in the 0 state, the OR circuit 135 delivers no signal on its output 19, and a signal is thus present on the conductor 20. At the time 2, the registering of the signal M1 appearing at the digit time slot P in the flip-flops 123, sets this latter to the 1 state. At the time 3, begins the digit time slot I in which the basic time slot *a* is reserved to the reading of the flip-flop. At this moment, since one has simultaneously the conditions: flip-flop 123 in the 1 state and digit time slot signal I, and AND circuit 133 is activated and a signal appears on the conductor 19, this suppressing the signal previously present on the conductor 20. At the time 4, the signal M2 appearing during the time I, registers in the flip-flop 124 and sets it to the 1 state. At the same time, the signal M1 is read in the flip-flops 123. At the time 5, coinciding with the basic time slot *b* reserved to the resetting of the flip-flop 123 in the 0 state, this operation is carried out and one has simultaneously the conditions: flip-flop 124 in the 1 state and digit time slot signal I, as well as flip-flop 123 in the 0 state and the digit time slot signal I. The AND circuits 133 and 134 are not activated, the signal applied on the conductor 19 is suppressed and a signal appears on the conductor 20.

At the time 6, digit time slot signal P appears and one has then simultaneously the conditions: flip-flop 124 in the 1 state and the digit time slot signal P as well as flip-flop 123 in the 0 state and digit time slot signal P. The AND circuit 134 is activated and a signal appears on the conductor 19.

The times 7 and 8 are the basic time slots *a* and *b* respectively reserved to the reading and the resetting to 0 state of the flip-flop 124. When this last operation is carried out, one has simultaneously the conditions: flip-flop 124 in the 0 state and the digit time slot signal P as well as flip-flop 123 in the 0 state and the digit time slot signal P. The AND circuits 133 and 134 are not activated and a signal appears now on the conductor 20. The signal existing during this digit time slot P being the signal $\overline{M3}=0$, the state of the flip-flop 123 is not modified.

At the time 9, placed in the next digit time slot I the signal M registers in the flip-flop 124.

At the time 10, corresponding to the beginning of the next digit time slot P, one has simultaneously the following conditions: flip-flop 123 in the 0 state and digit time slot signal P as well as flip-flop 124 in the 1 state and the digit time slot signal I, which are the same conditions as those set up at the time 6.

To sum up:

One has a signal on the conductor 19—
- Either when the flip-flop 123 is in the 1 state at the time I.
- Or when the flip-flop 124 is in the 1 state at the time P.

One has a signal on the conductor 20—
- Either when the flip-flops 123 and 124 are simultaneously in the 0 state.
- Or when, at the time P, the flip-flop 123 is in the 1 state and the flip-flop 124 in the 0 state.
- Or when at the digit time slot I, the flip-flop 123 is in the 0 state and the flip-flop 124 in the 1 state.

The second input of the AND circuits 141 and 142 receives, for the present position information A, a signal at each basic time slot *a* delivered by the circuits 144 and 143, this signal being shown FIGURE 14*g*.

At the basic time slot *a* of the reading of the state of the flip-flop 123, assigned to the signal M1 (time 4), one has a signal on the conductor 19 and the circuit 141 is activated. The flip-flop 139 sets then to the 1 state as shown on FIGURE 14*h*. Since the condition A is included in the condition $\overline{D}$, the AND circuit 147 is activated as shown on FIGURE 14*h*, and the signal M1 is transmitted to the flip-flop 151 which sets to the 1 state.

In the same channel, it is seen on the figure that the signal M2 is transmitted at the following time slot *d* (time 12) and that, at the time 9, the flip-flop 139 resets to the 0 state. It sets back to the 1 state at the time 13 and the signal M3 is transmitted, with a time lag of 2 digit time slots in relation with the signal M2, at the time 14.

The time lag R1 brought to the signal M1 by the circuit 130, has been shown on the FIGURE 14*d*, this time lag being greater in the example considered than the duration of 3 basic time slots. FIGURE 14*j* shows also the time lag R2 of 3 basic time slots brought, in the case of the example, by the circuit 140. It will be recalled that the considered signals occupy on the FIGURE 14 their mean positions.

The operation of the blocks 280 and 120 may be summed up as follows: the channel itme slot of a reference signal extracted from the message signal is compared with 4 basic time slot signals *a*, *b*, *c*, *d*. A position information is thus elaborated which is corrected by means of the position information which existed previously, and a present position information A, B, C or D is obtained.

Since the message signals are registered at the trunk time in a suitable store (circuit 130) this present position information is used to carry out the reading thereof in order that any message signal be avialable at the basic time slot *d* for registering in the flip-flop 151 before its transfer, at the following time slots *a* and *b*, delimited by the AND circuit 152, in the data store 160 and this whatever be its time of registering in the store 130. Thus, if the condition B is present, the message signal coincides with the basic time slot signals *bc*, *c* or *cd* (Cf. FIGURES 13*d*, 13*e*, 13*f*) but it is available for registering in the flip-flop 151 only from the following basic time slot *d* on, etc. . . .

Since the channel time slot of the message signals transmitted on a trunk varies under the effect of the slow fluctuation, it is possible that a given programme I delivers a present position information elaborated during the preceding programme I.

It has been seen, at the end of the study of the block 280, that this modification of the position information was transmitted at the time 7'*a* and 7'*b* to the storage circuit 150 of the block 120. During these basic time slots *a* and *b*, the message signal 7, i.e. the message signal placed at the digit time slot 7, the channel time slot of which has been determined by means of the old information, is registered in the flip-flop 151.

The new information is applied in 7'*a* to the flip-flop 153 and 154 and is present in 7'*b* on the decoder 155.

At this moment, the message signal 8 is stored in one of the flip-flops 123 or 124 as it may be checked by comparing the signal M2 of the FIGURE 14*e* with the signal M1 of the FIGURE 14*j*.

It will be admitted, for instance, that this message signal has been registered at the time P in the flip-flop 123. At the following time I, the state of this flip-flop will be transmitted to the circuit 140 and the flip-flop will be afterwards reset to the 0 state.

Referring to the explanations given during the study of FIGURE 11 as well as to Table II, it is seen that the position information is modified only if the reference signal which has coincided during a certain time interval with two basic time slots, for instance, with the time slots *a* and *b*, coincides now with only one of these two time slots (*a* or *b*) or with the two others (*c* and *d*).

FIGURE 15 shows the diagram of the signals I during which the reading and the resetting to 0 are performed in the case of the example when the message signal 8 is registered in the flip-flop 123. A succession of 8 basic time slots has been shown in (1) and the vertical (2) shows the time of the position change which, as it has just been seen, takes place at the beginning of the time slot *b*. It has been assumed, on this figure, that the position change was effected at the time I.

During this time slot, a writing is effected in the flip-flop 124 but, since this operation being performed at the trunk time, it will not be influenced during the change.

One has shown in the columns (3) and (4) the 10 possible positions of the signal I, with respect to the basic time slot signals which correspond to the 8 cases of position information modification such as they are referenced in the columns (3) and (4).

It has been admitted, in order to arrange the line segments showing the positions of the signal I, that the position information modification was carried out as a result of the coincidence of the reference signal with one single basic time slot signal, and this with a certain time lag so that the old position information still exists in the circuit 120, whereas the signal I is positioned according to the present position information.

The times of reading and resetting to 0 of the flip-flop 123 must thus be chosen according to the old position information for the part of the signal I located on the left hand side of the vertical (2) (region with the reference IPAN on the figure) and according to the present position information for the part of the signal I located at the right hand side of the vertical (2) (region with the reference IPAC on the figure). These times are respectively referenced L and Z on the figure.

In the couples of conditions shown on column (3) which correspond to a phase shift of the message signal in the positive direction of the phases, it is seen that the reading and resetting to 0 are carried out in a normal channel in the cases C'D and B'C.

In the case D'A, two resettings to 0 of the flip-flop 123 are performed, at successive basic time slots, this presenting no inconvenience at all. In the case A'B two successive readings are performed, at the basic time slots *a* and *b*, of the contents of the flip-flop 123 which also presents no inconvenience at all, since this information registered in the flip-flop 139 (FIGURE 4) is utilized only at the next basic time slot *d*.

In the couple of conditions shown on column (4) corresponding to a phase shift in the negative direction of the phases, it is seen that the reading and the resetting to 0 are carried out in a normal channel in the cases D'C and C'B. In the case B'A the flip-flop 123 is reset to the 0 state without the performance of any reading and the message signal 8 is lost, this representing no inconvenience at all since it is not registered in the data store.

Last, in the case A'D, the information is read in the flip-flop 123, which is not reset to 0 during the time I assigned to this operation. Therefore, at the following digit time slot I, the flip-flop will be in the 1 state, and if the digit which presents itself on the input 13 of the circuit 130 (FIGURE 4) to be registered at this moment is a 0, the flip-flop will remain in the 1 state and the information transferred to the flip-flop 151 (FIGURE 4) will be erroneous.

It will be noted that this case happens during the correction of an error on the pulse synchronization the process of which has been described during the study of FIGURE 3. This correction consists in a lead operation to be carried out on the digit counter of the data store during the passage of the synchronization code, and it will be seen further on that it is carried out when the digit counter is in position 3'. This advance of the digit counter compensates the error but in an anticipated channel since, up to the time 7'*b*, the new position information is not shown out. It results that it is the signal W25.7 which is read in the flip-flop 123 just before the change of the position information. The signal W25.8 being read at the following digit time slot P, it will be the signal W1.1 which will be read in an erroneous channel if it is equal to 0.

According to a particular characteristic of the invention, this inconvenience is obviated by choosing a synchronization code in which at least the signal W25.7 is a figure 0.

The retiming unit 120, the operation of which has just been studied in detail, allows therefore for the registering of all the message signals in the flip-flop 151 at the same basic time slot *d*. But it has been shown on FIGURE 3 that if one had, after a position information change, one of the couples of conditions A' and D or D' and A, one had an error at the registering in the data store 160. It has also been shown that this error indicated the necessity to carry out either a lead or a lag operation on the digit counter said store, the detailed explanation of which will be given further on.

TABLE III

| 1 | 2 | 3 | 4 | 5 |
|---|---|---|---|---|
| | | | | Program I—Common part |
| | | | | (Operations performed on the trunk No. p selected by the selector 331, FIGURE 7). |
| 1 | | tn.1 to tn.4 | | Elaboration, in the reshaper 282 (FIGURE 6), of the reference signal. |
| 2 | | tn.2 to tn.4 | | Transfer of the signal S to the flip-flop 284a to 284d (FIGURES 6 and 11). |
| 3 | | tn.5 | | Elaboration of the PPI (abbreviation for: present position information) and selection of the corresponding output of the decoder 336 (FIGURE 11). |
| | | | | Program Ia |
| | | | | No error information—Condition $\overline{Ro}$. |
| 4 | | t(n+1) | | Transfer of the code of the trunk No. p in the logical block 334. Trunk No. p+1 is selected by selector 331 (FIGURE 7). |
| | | | $t(n+1)\times\overline{Ro}$ | Authorization of transfer of the PPI in the circuit 150 (FIGURE 4). |
| 5 | | 7'ab | $t(n+1)\times\overline{Ro}\times 7'ab$ | Transfer of the PPI in the circuit 150. |
| 6 | | t(n+2) | $t(n+2)\times\overline{Ro}$ | Inscription of the code of the trunk No. p+1 in the register 331-1. |
| | | | | Program Ib |
| | | | | One error information—Condition Ro. |
| 7 | | tn.6 | $(A'D+D'A)\times tn.6=Ro$ | Inscription of the condition "one error" in the flip-flop Ro (AND circuit 296, FIGURE 6). |
| 8 | | t(n+2) | $t(n+2)\times Ro$ | The code of the trunk No. p is still stored in register 331-1. |
| 9 | C3 | V25 | | Transfer order of the PPI in the circuit 150 during the performance of hte error correction (AND circuit 227 FIGURE 6). See II-7. |

TABLE III—Continued

| 1 | 2 | 3 | 4 | 5 |
|---|---|---|---|---|
| 10 | C3 | 7'ab | | See program I–5. |
| 11 | C3 | V1.3 | C3×V1.3×R'o=C1 | See program II–8. |
| 12 | C1.C2 | t23.5 | C2×t23.5→$\overline{R}$o | See program II–9–10. |
| | | | | Program I—Common part |
| 13 | | tn.1 | tn.1×$\overline{R}$o | Clearing of the flip-flops 289, 291 (FIGURE 6) and 364, 365 (FIGURE 11) which stored respectively the PPI and the old position information. |

The trunk *p* being selected by the selector 331, the present position information is elaborated between the times *tn*.1 to *tn*.5 (operations 1 to 3). If no error has been detected, the programme I*a* is carried out and the new present position information is registered in the circuit 120 for the condition $t(n+1)\times\overline{R}o\times 7'ab$ (operations 4 and 5). At the time $t(n+2)$ the code $p+1$ of the following trunk is registered in the decoder 331.

If an error has been detected, the programme I*b* is carried out and the operation 7 takes place after the operation 3, which sets the flip-flop 216 to the condition $\overline{R}o$. At $t(n+2)$ the content of the counter 331 is not modified and the trunk *p* is always selected. At the following time $C3\times V25$, the error is corrected and the new present position information is transferred in the circuit 120 at the time V25.7'*ab* (operation 10). This transfer is authorized by the opening, in V25, of the AND circuit 227. The operations 11 and 12 are placed as recall of the operations 11–9 and 11–10 of the programme II, which will be described further on. The flip-flop 216 being then in the condition $\overline{R}o$, one comes back to the common part of the programme and, in *tn*.1, the information shown out in the decoders 292 and 366 are wiped out (operation 13).

It has been seen during the study of FIGURE 2, that the message signal delivered by the retiming unit 120 on the conductor 11, could register without error, in the data store 160, only if the address counters of the said store advance in synchronism with the signals. Thus, the synchronism is correct if the signal which appears at a given digit time slot on the conductor 11 being the signal W5.3 the address counters select the address V'5.3'.

If it is admitted that at a given digit time slot these conditions are fulfilled, the corrections brought by the pulse synchronizaion circuits just studied are sufficient to maintain indefinitely, at least theoretically, the channel synchronism.

Nevertheless, this latter may be lost, first during the starting of the device, and second, if during exploitation, the transmission has been submitted to important disturbances. It is thus necessary to check periodically the channel synchronism and as the case may be, to reestablish it, these operations being controlled by the programme III.

To carry out what is stated hereabove, a particular comparison element is available: the synchronization code transmitted on the 25th channel which is always identical. As all the other messages, this code comprises 8 digits which will be called as follows: digit of rank 1 that one occupying the less significant digit time slot, digit of rank 2 the one occupying the next most significant digit time slot, etc. . . .

FIGURE 7 comprises in particular, the detailed diagram of the coincidence detection unit 230 which detects the coincidence which is used to check the message arriving during the time reserved to the synchronization code, and as the case may be to search said code. It will be assumed that this message is transmitted, with the most significant digit being the first one.

This unit comprises the registers 232 and 238, each comprising three flip-flops, the decoder 233 and the encoder 237, the logical block 240, the single AND circuits 231, 236, 239, 242, 244, the OR circuit 231, the inverters 241 and 243, the multiple AND circuits 234 and 235 each comprising 8 single AND circuits referenced 1 to 8. Its operation is controlled by the signal C3 delivered by the counter 319 of the clock 310 (FIGURE 8) and by the time signal V25 elaborated in said clock only when the signal C3 is present.

It will be assumed that the device is just starting and that the selector 341–1 shows out the code of the trunk *v* for checking the channel synchronism of the said trunk. A signal appears on the conductor 34 assigned to this trunk and in particular, the AND circuits 101 and 107 (FIGURE 5) are energized. The AND circuit 101 is inserted on the conductor 11 which can transmit thus the message signals eventually extracted at the basic time slots *a* and *b* defined by the AND circuit 152 and the flip-flop 151 (FIGURE 4) towards the block 230. The AND circuit 107 is inserted on the conductor 16 on which appears a signal during all the selection time of the addresses V'25 in the data store 160. It has been seen, during the study of the local clock 310 (FIGURE 8) that a signal V25 which lasts from V'25.1*b* to V'25.8*b*, was elaborated from this signal. It will be assumed that, at the setting into operation, the channel counter of the store 160 (FIGURES 4 and 5) shows out a code other then code V'25. In these conditions, there is no signal V25, and if temporarily the conductor 26 is not taken into account, the OR circuit 231 delivers no signal on its output 23.

The inverter 243 delivers then a signal which is applied to the logical circuit 240 designed in order to deliver in these conditions a signal on its output 46.8. This signal passes in the encoder 237 which delivers the binary number 0000=decimal 0 or 8 and this number is stored in the register 238. At the first basic time slot *d*, the AND circuit 244 is activated, this number is stored in the register 232 and a signal appears on the output 45–8 of the decoder 233.

When the signal V25 appears, the OR circuit 231 delivers a signal on its output 23 which is applied at the following times *b* delimited by the AND circuit 242, to the first input of the AND circuits 239 and 236. On the other hand, the inverter 243 delivers no more signal so that the signal 46–8 is suppressed.

The state of the flip-flop 151 of the block 120 (FIGURE 4), which characterizes the absence or the presence of a message signal and which is available for utilization at the times *a* and *b*, is applied directly to the AND circuit 239 and in its complemented form (by the inverter 241) to the AND circuit 236. At each basic time slot *b*, only one of these AND circuits thus delivers a signal characterizing a 1 when it appears on its output 43 (presence of a message signal) and a 0 when it appears on its output 44 (absence of a message signal).

These conductors 43 and 44 are connected respectively at the first input of each one of the AND circuits of the groups 234 and 235.

The second input of each one of these AND circuits is connected to the output of the decoder 233, from which is carried, in fourth figure, the order number. Thus, the second inputs of the circuits 234–8 and 235–8 are connected to the output 45–8 of the decoder.

In short, the AND circuits 234 are energized when a signal exists on the conductor 43 and the AND circuits 235 are energized when a signal exists on the conductor 44.

Coming back to the previous example the number 8 is stored in the register 232 and the output 45–8 of the decoder 233 is selected. At the first time *b* of the time V25 (i.e. at V'25.1'*b*) one of the AND circuits 234–8 or 235–8 is activated, characterizing a time slot reserved to the most significant digit of the synchronization code, or digit of rank 8, and a signal is applied to the logical block 240 which is designed in such a channel that if the first signal is identical to the one which must be received at this digit time slot of the synchronization code, it delivers a signal on its output 46.7. In the opposite case, it delivers a signal on its output 46.8.

If a signal is present on the terminal 46.7, the register 238, shows out the digit of rank 7 obtained through the encoder 237 and this digit registers at the following time *d* of V25 (i.e. in V'25.1*d*) in the register 232. A signal appears now on the output 45.7 of the decoder 233. At the first following time *b* (i.e. in V25.2*b*) one of the AND circuits 234–7 or 235–7 is activated and a signal is applied to the logical circuit 240.

The operation of this circuit 240 will now be studied in a more detailed channel by means of the Table IV.

The digits of ranks 45–8 to 45–1 of the outputs which may be successively selected on the decoder 233, have been shown in the column 1.

The column 7 shows the number which remains valid in certain comparison cases wherein the last digit received is wrong.

The column 8 shows the case when the logical circuit 240 delivers a signal on its output 24.

Last, the column 9 shows the positions during the comparison of the address counters of the data store, when the channels are in synchronism.

If it is assumed first of all that the channels are in synchronism at each time of the column 9, an exact digit will be received (the first digit in the column 2) from each one of the lines of the Table IV and at each time, the output 46 of lower rank will be selected by the logical circuit 240 as indicated on column 6 of Table IV.

The reception of the digit of rank 2 will coincide with the selection of the output 45–1 and, if the digit of rank 1 is correct, a signal will appear on the output 24 of the logical circuit, as indicated on column 8 of Table IV. This signal 24 appearing at the end of the time V25 characterizes the fact that the message received during this time corresponds to the synchronization code and that the synchronization is correct. The operation just carried out, will be called "channel synchronization test."

When the synchronization is bad, no signal 24 appears at the end of time V25 and, after a certain delay which will be defined further on, a signal 26 is applied to the OR circuit 231 and initiates a "free synchronization search."

The whole of the combinations of signals which may

TABLE IV

Synchronization code: 00111100

| 1 | 2 | 3 | 4 | 5 | 6 | 7 | 8 | 9 |
|---|---|---|---|---|---|---|---|---|
| 45–8 | 0<br>1 | 0<br>0 | –<br>– | 0<br>0 | 46–7<br>46–8 | | | V'25.1'b |
| 45–7 | 0<br>1 | 0<br>0 | 00<br>01 | 00<br>00 | 46–6<br>46–8 | | | V'25.2'b |
| 45–6 | 1<br>0 | 1<br>1 | 001<br>000 | 001<br>001 | 46–5<br>46–6 | 00 | | V'25.3'b |
| 45–5 | 1<br>0 | 1<br>1 | 0011<br>0010 | 0011<br>0011 | 46–4<br>46–7 | 0 | | V'25.4'b |
| 45–4 | 1<br>0 | 1<br>1 | 00111<br>00110 | 00111<br>00111 | 46–3<br>46–7 | 0 | | V'25.5'b |
| 45–3 | 1<br>0 | 1<br>1 | 001111<br>001110 | 001111<br>001111 | 46–2<br>46–7 | 0 | | V'25.6'b |
| 45–2 | 0<br>1 | 0<br>0 | 0011110<br>0011111 | 0011110<br>0011110 | 46–1<br>46–8 | None | | V'25.7b' |
| 45–1 | 0<br>1 | 0<br>0 | 00111100<br>00111101 | 00111100<br>00111101 | 46–8 | None | X | V'25.8'b |

Column 2 showns one of the two digits 1 or 0 which can be received at each one of the successive times *b* and the column 3 the digits which should have been received at these times, if the synchronization was good, the whole of the synchronization code being shown at the top of the table, the most significant digit, being the first one from the left.

The column 4 shows the number constituted by the digits previously received plus the digit received at the considered time.

The column 5 shows the number which should have been received at this time if the channels were in synchronism.

The column 6 shows the output of the logical circuit selected after comparison of the numbers registered in columns 4 and 5.

be received on the conductor 11 will be studied now. These combinations correspond, for each stage, to the digits and numbers given in the second line.

It will be admitted, for instance, that a digit 0 is received as digit of rank 8 (output 45–8 selected on the decoder 233). By comparing with column 3, it is seen that this digit is correct and therefore, at the following time *d*, the digit of rank 7 is checked (selected output 45–7). If a digit 1 is received, it is seen in column 3, that this digit is wrong and, besides, that it cannot constitute a digit of rank 7 of the synchronization code since said digit must be 0. One must then come back to the time *d* following the position 45–8 on the decoder 233, as indicated on column 6.

If a series of two digits has been recognized as belonging possibly to the synchronization code (number 00)

the decoder 233 selects the output 45–6 at the time V'25.2*d*. If a digit 0 is now received, it is seen, by comparing the second lines of columns 2 and 3, that this digit is wrong. It is seen, column 4 that the number thus constituted is 000 in which the two last digits may constitute the digits of rank 8 and 7 of a synchronization code. One will remain then, at the following time *d*, at the position 45–6 on the decoder 233 as indicated on column 6.

It is seen that, in the code comparator just described, each figure is kept or rejected according to the number of digits which precede and which follow it and that, in the most favourable case, the synchronization code will be detected by the examination of the signals which follow each other successively during at most 200 digit time slots, i.e. the duration of a repetition period.

To sum up, the test is initiated by the acting of the position V'25 in the channel decoder of the store 160 (FIGURES 4 and 5) which enables, as it has been seen during the study of the clock 310, the elaboration of a signal V25.

If the synchronization is good, it has been seen that a signal appeared at the end of this time V25 on the conductor 24. If it is not good, no signal appears at this moment and the comparator is blocked up to the time when the following signal V25 appears which initiates a new test.

A certain number of tests are thus carried out up to the time where three successive tests have given the same result: either 3 good synchronizations or "coincidences" or three wrong synchronizations or "non-coincidences."

In this last case, a search operation is initiated.

FIGURE 8 comprises in particular the detailed diagram of the synchronism detection unit 250 which carries out these operations.

It comprises the coincidence and non-coincidence counter 261, which comprises two registers 261–1 and 261–2 the four positions of which are referenced 0'', 1'', 2'', 3'', and a decoder 261–3, the logical circuit 264 associated to this counter; the flip-flops 251 and 252 which will also be referenced S1 and S'1, the flip-flops 266 and 267 which will also be referenced S3 and S4 and a certain number of AND circuits and of OR circuits.

The operation of this block 250 is controlled, first, by the signal C3 delivered by the counter 319 of the clock 310 and, second, by the time signal V1 delivered also by the clock, only during the time C3, and which lasts from V'25.8*b* to V'1.6*d*.

The counter 261 advances in the same channel as the trunk selectors of the block 330 and uses also a cyclic code. The code shown out in the register 261–1 becomes, in the block 264, the code of the following positon at the time V1.1*c* (AND circuit 263) and is shown out in the register 261–2. It is transferred at the time V1.2 (AND circuit 262) in the register 261–1 whose decoder 261–3 selectes the corresponding output. This counter is rest in the postion 0'' when the OR circuit 258 delivers a signal.

The flip-flops 251 and 252 are associated by means of the two input AND circuits 253, 254, 255. If, for instance, no signal appears on the conductor 24 at the time V25.8*b* and if the flip-flop 251 is in the 0 state the flip-flop 252 is reset to zero at time V1.4, the AND circuit 253 is energized at time V1.5, but no signal comes from the flip-flop 251 and the flip-flop 252 remains in the 0 state. In V1.6 a resetting signal is applied to the flip-flop 251 which remains in the 0 state. The two flip-flops being in the 0 state the AND circuits 254 and 255 are blocked.

If a signal appears on the conductor 24 at the following time V25.8*b*, the flip-flop 251 sets to the 1 state. In V1.1*a* the two flip-flops being in different states, the AND circuit 255 is activated and the register 261–1 of the counter 261 is reset to 0''. In V1.1*c*, this number is applied to the logical circuit 264 and, in V1.2, the decoder 261–3 shows out the position 1''. In V1.4 the flip-flop 252 receives a resetting signal which does not modify its state. In V1.5 the AND circuit 253 is activated and the flip-flop 252 sets to the 1 state. In V1.6 the OR circuit 259 delivers a signal which resets the flip-flop 251 to the 0 state.

If a signal 24 appears at the following time V25.8*b*, the flip-flop 251 sets to the 1 state. In V1.1*a* the two flip-flops being in the 1 state the operation of the counter is not modified and in V1.2 it sets to the position 2''. In V1.4 the flip-flop 252 shifts to the 0 state. In V1.5, the AND circuit 253 is activated and the flip-flop 252 receives a setting signal, but was already in the 1 state. In V1.6 the flip-flop 251 is reset to 0.

Therefore the flip-flop 252 constitutes a memory of the last condition received: if it is the 1 state, it is a coincidence, if it is the 0 state, it is a non-coincidence. The position of the counter 261 characterizes the number of identical conditions received successively since this counter is reset in 0'' each time that, at the time V1.1*a*, the state of the flip-flops 251 and 252 are different, then is set in the 1'' state at the following time V1.2 (AND circuit 262).

It has been seen, during the study of FIGURE 2, that three successive coincidences materialized by the flip-flop 252 in the 1 state and the position 3'' shown out on the counter, characterized a correct synchronization, and that three successive non-coincidences materialzed by the flip-flop 252 in the 0 state and the position 3'' shown out on the counter characterized a wrong synchronization.

Figure 5:
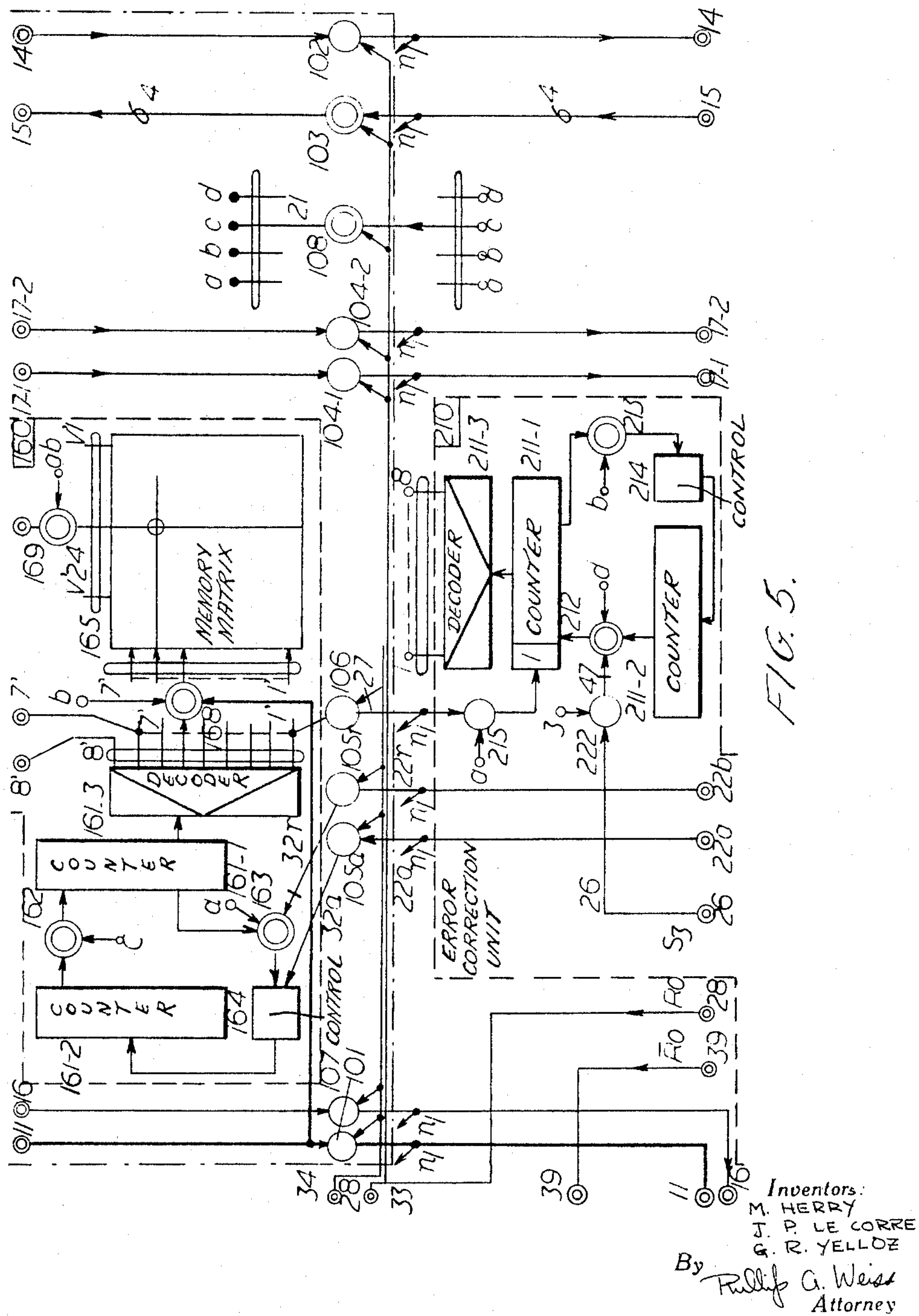
FIGURE 5 shows the detailed diagram, first, of the data store of a trunk circuit and, second, of the auxiliary digit time slot counter placed in the synchronization common circuit.

In the second case, the AND circuit 256 receives, on two of its inputs, the signals S'1 (flip-flop 252 in the 0 state) and 3''. This circuit is activated at the following time V1.3*c* and the delivered signal sets the flip-flops 266 and 267 to the 1 state. These flip-flops, as well as the circuits 268, 269, 272, 273, 274 have been placed in a particular circuit 270 which works in connection with the block 210 (FIGURES 5 and 6). A signal appears then on the output 26 of the block 230 and initiates a synchronization search. It will be seen further on that the setting of the flip-flops 266 and 267 to the 1 state blocks the advance of the address decoders of the store 160.

When after a time at most equal, as it has been seen previously, to the duration of a repetition period, the block 234 delivers a signal 24, the flip-flop 251 sets to the 1 state at the time V'25.8*b* and the AND circuit 272 delivers (at the time V'25.8*c*) resetting for the flip-flop 266 so that the free synchronization search is stopped and a channel synchronization test is initiated.

When three successive coincidences have occurred, one has in the local clock 310:

$$S'1 \times 3'' \times V1.3 \times C3 = C1$$

During the time C1 no operation takes place in the block 250 and one has:

$$C1 \times t23 = C2$$

This time is reserved to the resetting to zero of the counter 261 (by the OR circuits 260 and 258) and of the flip-flops S1 (through the OR circuits 260 and 259), S3 and S4.

One has afterwards:

$$C2 \times t2 = C3$$

It has just been reminded that, when 3 successive non-coincidences were detected, the advance of the digit counter of the store 160 (FIGURES 4 and 5) was blocked while the synchronization search just described was carried out. This operation as well as those which follow it, are performed by means of the error correction unit 210 (FIGURES 5 and 6) as well as through the circuit 270 of the synchronization detection unit 250 the general operation of which has not yet been described. Nevertheless before undertaking this description the data store 160 will be described in detail.

FIGURE 4 and 5 show in particular the data store 160. The memory matrix 165 in which the choice of a memory cell is carried out by coincidence of two selection signals, is equipped with elements enabling the performance of a writing and reading cycle in a time interval equal to the duration of a digit time slot, i.e. 500 *ns*.

The line selection signals are delivered on the outputs 1' to 7' of the decoder 161–3 fed by a digit counter comprising the registers 161–1 and 161–2 and organized in the same channel as the trunk selector 341 (FIGURE 7).

The decoder 161–3 comprises also an output 8' characterizing the 8th digit time slot of a channel which is not registered in the memory and this signal is used to control the advance of the channel counter 166–1. The decoder 166–2 associated to this counter shows out the column selection signals V'1 to V'24. The output V'25 of this decoder characterizing the synchronization channel which is not registered in the data store, is connected by the conductor 16, FIGURES 5, 7 and 8 to the local clock 310 (FIGURE 8).

The advancing of the digit counter is carried out in the following channel: the code contained in the register 161–1 is transferred in the logical circuit 164 at the time *a* delimited by the AND circuit 163 if an inhibition signal is not present on the input **32*r* of said circuit. The circuit 164 elaborates the code of the following position which is stored in the register 161–2**. At the following time *c*, delimited by the AND circuit 162, this new code is sent in the register 161–1 and the corresponding output of the decoder 161–3 is selected during the basic time slots *dab*.

This elaboration process of the new position code is modified when a signal is applied on the input **32*a* of the logical circuit 164. In this case, the new code jumps over one position: thus, if for instance the code contained in the register 161–1 is 3', the code 5' is shown out in the register 161–2 instead of the code 4'**.

A multiple AND circuit 168 is placed on the outputs 1' to 7' of the decoder 161–3 and it is activated when a message signal is present on the conductor 11 at the basic time slot *b*. In the same channel, a multiple AND circuit 169 is placed on the outputs V'1 to V'24 of the decoder 166–2, and it becomes activated at the basic time slots *a* and *b*. This AND circuit defines the time interval reserved to the writing and the signal delivered by the AND circuit 168 when a message signal appears, provokes effectively the writing at the time *b*.

As a non limitative example, a store which may be used according to the principle just discussed has been described in the French patent application PV No. 831,208 and its first addition PV 848,275 called "Matrix Arranged Capacitive Memory."

The output 7' of the decoder 161–3 is connected to the first input of an AND circuit 167 which receives on its second input the elementary signals *a* and *b* so that it delivers, on its output 49, the signal **7'*ab* applied to the groups of AND circuits 152 placed in the circuit 150** of the FIGURE 4.

The inputs **32*a* and 32*r* of the data store 160 associated with the considered trunk circuit are connected to the common synchronization circuit when the AND circuits 105*a* and 105*r* are activated by the signal delivered by the decoder 341 on the conductor 34** assigned to this trunk.

The FIGURES 5 and 6 comprise in particular the error correction unit 210 to which are associated the circuits 290 (FIGURE 6) and 270 (FIGURE 8).

This block controls the performance of the modifications brought to the advancing of the digit counter of the data store 160 in accordance with the errors detected, first, in the pulse synchronization circuits and, second, in the channel synchronization circuits.

It has been seen, during the study of FIGURE 2, that these modifications of the rate of advance consisted either in an advance or a delay of one position (pulse synchronization) or in a delay of a variable duration channel (channel synchronization) and that they were always performed during the passage of the synchronization channel defined by the time V25 supplied by the clock 310.

Before undertaking the general study of the correction control function, the channel of performance of these corrections will be studied.

The circuits involved in this control are, first, an auxiliary digit counter 211 placed in the common circuit (FIGURE 5) which delivers signals 1 to 8 and, second, the logical circuits 224, 225, 226 (FIGURE 6). The auxiliary digit counter 211 is identical to the digit counter 161 placed in the trunk circuit and comprises the elements 211–1, 211–2, 211–3, 212, 213 and 214. The elaboration of the code of the next position is carried out at the time *b* and its inscription in the register 211–1 is carried out at the time *d*, so that it is available on the corresponding output of the decoder 211–3 during the times *abc*. However, this inscription can take place only if an inhibiting signal is not applied on the input 47 of the multiple AND circuit 212. This inhibition signal is supplied by an AND circuit 222 which receives, on its first input, a signal transmitted on the conductor 26 and, on its second input a signal when the counter 211 is in the position 3.

As long as these two signals coincide, the circuit 222 delivers the inhibition signal 47 which blocks the advance of the counter 211 on the position 3.

Besides, the register 211–1 is connected by the conductor 27 to the output 1' of the decoder 161–3 of the store 160 through the AND circuits 106 and 215, this latter being conductive at each time *a*. This connection enables to carry out a synchronization of the two counters from the position 1' of the decoder 161–3 the selection of which sets the counter 211 to the position 1.

The signals delivered by this counter 211 have the same references as those delivered by the decoder 312–1 placed in the clock 310 (FIGURE 8). However, no confusion whatsoever can occur between these two types of signals since, as it has been noted during the description of the block 310, the signals delivered by the decoder 312–1 are used only with channel time slot signals *t1* to *t25* delivered by the decoder 312–2.

The performance of a lead operation in the digit counter 161 is controlled by the AND circuit 224 (FIGURE 6) which transmits the signal which is present on its input **12*a* on the conductors 22*a* and 32*a* when a signal is applied on its input 50 at the time V25. This lead operation is carried out independently from the duration of the activation time of the AND circuit 224**.

The signal 50 characterizes the condition **R'*o* on a flip-flop 217 of the circuit 210**. Its mode of elaboration will be described later on.

The performance of a lag operation (one digit time slot delay) is controlled by the four input AND circuit 225 (FIGURE 6). Since the digit counters 161 and 211 are synchronized, as it has been seen previously, the counter 211 is in the position 4 at the times *abc* and the counter 161 is in the position 4' at the times *dab*.

The AND circuit 225 transmits the signal present on its input **12*r* to the conductor 22*r*** when the following signals coincide:

Time V25
Signal 50
Position 4 of the decoder 211–3 during the basic time slots *abc*, (signal **4*abc***).

The duration of the signal on the conductor **22*r* is thus controlled by this last signal, which is the shortest of the three and it is applied on the inhibition input 32*r* of the AND circuit 163 during the times $4abc$. Since the counters 161 and 211 are synchronized, the counter 161 is in the position 4′** during the times *ab*. This code position 4′ had to be transmitted to the logical circuit 164 during this time *a* (AND circuit 163) (FIGURE 5) but the inhibition signal 32*r* hinders this transfer. The inhibition is suppressed at the following time *d* and the code of the position 4′ may arrive to the circuit 164 at the following time *a* so that the counter 161 is in the position 4′ during two consecutive digit time slots.

The performance of a lag operation of a variable duration for a channel synchronization operation is carried out in the same channel, except that the signals 42*r* and 32*r* which control it have a variable duration. The counter 161 always stops on the position 4′ after the apparition, in V1.3*d*, of the signal 42*r*, the operation taking place in the logical circuit 164.

It has been seen during the study of the block 250 (FIGURE 8), that the flip-flops 266 and 267 set to the 1 state at the same instant. The 1 state of the flip-flop 267 is characterized by the presence of the signal 42*r* the use of which has just been described. The 1 state of the flip-flop 266 is characterized by the presence of a signal S3 on the conductor 26 which is connected at the input of the AND circuit 222 associated to the counter 211. It will be reminded that a signal S3 characterizes the detection of 3 successive non coincidences.

Thus, when the signals 42*r* and 26 appear, the counter 161 (FIGURES 4 and 5) stops on the position 4′ and the counter 211 (FIGURE 5) stops on the position 3 as it has been seen previously.

The unblocking of these counters is obtained by the suppression of the signals 42*r* and 26.

As it has been seen during the study of the block 250 (FIGURE 8), the flip-flop 266 resets to the 0 state when it receives a signal delivered by the AND circuit 272, this signal characterizing a coincidence between the signals received and the code registered in the logical circuit 240 (FIGURE 7). The signal 36 is cancelled and the counter 211 starts from the position 3. When it reaches the position 6, the AND circuit 268 is activated at the basic time slot *c* of said position, and the signal it delivers resets the flip-flop 267 to the 0 state. The signal 42*r* is thus suppressed and the counter 161 starts from the position 4′. The two counters are thus out of synchronism and this lasts up to the time when the counter 161 is once again in the position 1′. At this moment, a synchronization signal is transmitted on the conductor 27 which makes the counter 211 jump to the position 1.

FIGURE 16 shows the position diagram of the counters 161 and 211 during this operation.

FIGURE 16*a* shows the times V25.8 to V2.1 necessary for this synchronization.

The FIGURES 16*b* and 16*d* show the states of the flip-flops 266 and 267 the symbols of which are the same as those of FIGURE 12.

The FIGURES 16*c* and 16*e* show respectively the positions shown out by the counters 211 and 161.

The times of application of the signals delivered by the AND circuits 272 and 268 to the flip-flops 266 and 267 have been shown by the arrows placed at these times, the changement of state of the corresponding flip-flop being performed with a delay of about half a basic time slot.

The transfer of the new code in the counter 211 being performed at the basic time slot *d*, this counter starts without any delay and shifts to the position 4 at the time V1.1*a* as indicated on FIGURE 16*c*. On the contrary, the elaboration of the new code in the counter 161 being performed at the basic time slot *a* and the inhibition of the AND circuit 268 being suppressed only at the time *c*, the showing out of the new code is carried out with a delay of 5 basic time slots as it may be seen on the FIGURE 16*e*.

When the counter 161 is in the position 1′ the AND circuit 215 (FIGURE 5) is activated and the counter 211 is reset to the position 1 as indicated by the arrow connecting the FIGURES 16*e* and 16*c*, at the time V2.1*a*.

The signal delivered by the block 230 (FIGURE 7) on the conductor 24 characterized the last digit W25.8 of the synchronization channel. Up to the time V1.3 it is seen that the channel decoder of the data store shows out the code 4′ and that the selected addresses are wrong.

The operation of the auxiliary digit counter 211 placed in the common circuit may be summed up as follows. During the performance of a programme III it is synchronized with the counter 161 of the selected trunk and advances with a delay of one basic time slot with respect to this counter (cf. FIGURES 16*c* and 16*e*). When 3 non coincidences are detected, it is blocked in the position 3, whereas the counter 161 is blocked in the position 4′. When a checking operation has enabled to find again a code similar to the synchronization code, this counter 211 is unblocked first and, after 3 digit time slots, it controls the unblocking of the counter 161 which shows out then exact positions for the message signals.

The insertion, in the common synchronization circuit, of this auxiliary digit counter synchronized with the trunk digit counter on which one operates enables to reduce in an appreciable proportion the number of connections between the common circuit and the trunk circuits. Effectively, the counter 211 is connected to the trunk circuits only through the multiple AND circuit 106 (FIGURE 5) whereas the positions 1 to 8 are used in the common circuit as indicated in the Table V.

TABLE V

| Position | Circuits energized by this signal | Bloc | Figures | Description |
|---|---|---|---|---|
| 3 | 222 | 210 | 5 | |
| | 265 | 250 | 8 | Table VIII |
| | 315 | 310 | 8 | Table VII |
| 4 | 225 | 210 | 6 | |
| | 252 | 250 | 8 | |
| 5 | 269 | 250 | 8 | Table IX |
| | 253 | | | Table VII |
| 6 | 268 | 250 | 8 | Table IX |
| | 259 | | | |
| 7 | 323 | 310 | 8 | |
| 8 | 321, 322 | 310 | 8 | |
| 1 | 257 | 250 | 8 | |
| | 320 | 310 | 8 | |
| | 263 | 250 | 8 | Table VII |
| 2 | 262 | 250 | 8 | |

The realized economy is thus, for $n_1=10$, of 70 single AND circuits.

It has been settled at the end of the study of the retiming unit 120 (FIGURE 3) that the necessity of performing a correction on the advancing of the digit counter of the data store 160 was determined by the presence of one of the conditions A′D or D′A.

The old position information is then available in the block 280 of FIGURE 6 during the time *tn*.2 (activation of the AND circuits 287 and 288 in *tn*.2 plus 1 basic time slot for the changement of state of the flip-flops 289 and 291) and the present position information is available at latest during the time *tn*.5 (activation of the AND circuits 362 and 363 plus 1 basic time slot for the changement of state of the flip-flops 364 and 365, see FIGURE 11).

Therefore a couple of old previous and present conditions may be available from the time *tn*.6 on.

These couples of conditions are elaborated in the circuit 290 of the block 280. The AND circuit 293 is assigned to the detection of the couple of conditions A′D and delivers a signal on its output 12*a* when it is activated. The AND circuit 294 is assigned to the detection of the couple D′A and delivers a signal on its output 12*r* when it is activated. These outputs are respectively connected to one of the inputs of the AND circuits 224 and 225 of the error correction unit 210 which, as it has been seen, control the performance of the corrections.

The outputs 12*a* and 12*r* are also connected, through the AND circuit 295, to the AND circuit 296 which is activated at the time *tn*.6, which as it has just been seen, is the first time slot at which one is sure that the old and present position informations are effectively applied to the AND circuits 293 or 294.

The signal delivered by this AND circuit 296 is applied to the flip-flop 216 of the block 210 (which is also referenced R*o*) in order to set it to the 1 state.

The outputs 0 and 1 of this flip-flop are connected respectively to the inputs 0 and 1 of a flip-flop 217 (which is also referenced R'*o*) through the AND circuits 220 and 221. These two circuits are controlled by the AND circuit 219 which delivers a signal at the time *t*23.7 when the counter 319 of the block 310 is in the position C2 (FIGURE 8).

Last, when the flip-flop 217 is in the 1 state it controls the resetting of the flip-flop 216 shift to the 0 state if the AND circuit 218 is activated, which happens at the time *t*23.5 of C2.

It will be admitted that the two flip-flops are initially in the 0 state, and this will be written $\overline{Ro}$ and $\overline{R'o}$.

It is known that on the one hand, since $$n=1–4–7–10–13–16–19–22$$

the time *tn*.6 is as least equal to the time *t*1.6 and at most equal to time *t*22.6 and on the other hand, that $$C2=C1\times t23 \text{ and } C3=C2\times t2$$

Therefore, if an error signal is applied to the AND circuit 296, the flip-flop R*o* sets to the 1 state in *tn*.6. At the time $C2\times t23.5$, the AND circuit 218 is activated but, since one has the condition $\overline{R'o}$, the state of R*o* is not modified. At the time $C2\times t23.7$, the AND circuits 220 and 221 are activated and R'*o* sets to the 1 state. The conditions existing on the two flip-flops are thus at, this time, R*o* and R'*o*.

It has been seen, during the study of the programme IV (Table I) of the trunk decoders 330 that, as long as the condition $\overline{Ro}$ prevailed (Sub-programme IV*a*), the decoder 33 advances by one position at each new value of *n*. As soon as one has the condition R*o*, one shifts to the programme IV*b* (operations IV*b*–6–7–8) and the advancing of the decoder 331 is blocked. The operation IV*b*–7 at the time $C2\times t25$ enables the selection of the trunk on which the correction of the error must be performed. It has been seen previously that the performance of this correction was controlled by the AND circuits 224 and 225 which are activated by the condition $V25\times R'o$.

The Table VI represents the operations which are performed during this programme II. The columns 1 to 5 have the same meaning than in the Table I, but in this table the times of changement of the conditions C1, C2, C3 have been stated.

The operations II–1, 2, 3, 4, 5 and 7 are those which have been just described.

The operation II–6, which corresponds to the time taken to shift from the exchange time *t*2 to the time V25 defined by the position of the digit counter of the store 160, is a beginning of a programme III, the result of which is not utilized (the said programme III will be studied further on).

When the correction of the error is carried out in III.7, one shifts to the position C1 in V1.3 (II.8) and to the position C2 in *t*23 (II–9).

At the time *t*23.5, the AND circuit 218 is activated and R*o* resets to the 0 state (II–10). At the time *t*23.7, the AND circuits 219 and 220 are activated and R'*o* resets to the state (II–11). Last, at the time *t*24, which corresponds to the time $t(n+2)$ for $n=22$, the operation IV*a*–2 of programme IV (Table I) is performed, this operation enabling the selection of the following trunk code for the performance of a programme I.

TABLE VI

| 1 | 2 | 3 | 4 | 5 |
|---|---|---|---|---|
| | | | | Programme II |
| 1 | | tn. 6 | (A'D+D'A) tn.6=Ro | Correction of the error shown out by the pulse synchronization circuits. By the logical circuits 295, 296 and the block 290 (FIGURE 6). |
| 2 | C1 | t23 | C1×t23=C2 | |
| 3 | C2 | t23.7 | C2×t23.7×Ro=R'o | By the logical circuits 219 and 221, unit 210 (FIGURE 6). |
| 4 | C2 | t24, t25 | C2×t24×Ro | See programmes IVb–6 and IVbb–7 (Table I). The trunk No. p whereupon the error correction will be performed is selected by the selector 341. |
| 5 | C2 | t2 | C2×t2=C3 | |
| 6 | C3 | | | A programme III (channel synchronization programme) is started, between the operations II.5 and II.7. Its results are not used. |
| 7 | C3 | V25 | V25×R'o | Execution of the lead or lag operation by the activation of the AND circuit 224 or 225 (block 280, FIGURE 6) and modification of the PPI. |
| 8 | C3 | V1.3 | C3×V1.3×R'o=C1 | See description of the local clock 310 (FIGURE 8). |
| 9 | C1 | t23 | C1×t23=C2 | |
| 10 | C2 | t23.5 | C2×t23.5×R'o=$\overline{Ro}$ | By the activation of the AND circuit 218 (unit 210, FIGURE 6). |
| 11 | C2 | t23.7 | C2×t23.7×$\overline{Ro}$=$\overline{R'o}$ | By the activation of the AND circuits 219 and 220 (unit 210, FIGURE 6). |
| 12 | C2 | t24 | t(n+2)×$\overline{Ro}$ | See programme I, table IV and operation IVa.2, table I. |

On the other hand, in II–7, the condition $V25 \times R'o$ applied to the AND circuit 227 enables the elaboration of a signal 40 which activates the AND circuit 286 through the OR circuit 299 thus enabling the transfer to the circuit 150 of the new present position information A or D. It will be observed that one is at this moment in the condition $\overline{Ro}$ whereas the transfer, when there was no error correction, was controlled by the condition R*o* as it has been seen previously.

The process of programme III which controls the channel synchronization test and the correction of the channel synchronization shall now be studied in a general channel.

It has been seen, during the study of the FIGURE 2, that a programme III was performed permanently, except when a programme II had to be carried out.

It has just been seen, during the study of this programme II (Table VI) that this latter started as a result of the setting to the 1 state of the flip-flop 217 (condition R'*o*) at the time $C2 \times t23.7$.

On the other hand, the channel synchronization test described during the study of the block 250 (FIGURE 8) ends after the obtention of 3 successive coincidences and non-coincidences. The duration of the operation is thus equal at the minimum to 3 repetition periods, but, because of disturbances or of the detection of a group of signals identical to the synchronization code, this duration can be more important and the counter 261 (FIGURE 8) may show out the position 3″ only after an alternation of coincidences and non-coincidences.

The program III must be studied therefore for the following cases:

programme III*a* shown in the Table VII—Condition $\overline{R'o}$—three successive coincidences.

programme III*b* shown in the Tables VIII and IX—Condition $\overline{R'o}$—three successive non-coincidences.

programme III*c* shown in the Table X—Condition $\overline{R'o}$—alternation of coincidences and non-coincidences.

programme III*d* shown in the Table XI—Condition $\overline{R'o}$.

In all these tables, the reference figures of the columns have the same meaning than in the Table I. The programmes III*a*, *b* and *c*, related to the condition $\overline{R'o}$, start at the time C2 during which the flip-flops 251 and 252 are reset in the 0 state and the coincidence counter 261 is found in the state 0″.

The programme III*a* will be first examined.

At the time $C2 \times t2$, one shifts to the position C3 (operation 2). The operations 3, 4 and 5 have been described during the study of the coincidence detection unit 230 (FIGURE 7) and, in V25.8*b*, one has the condition S1.

In V1.2 (operation 6) the counter 261 is put in the position 1″. In V1.4 (operation 7) the flip-flop 252 is reset in the condition $\overline{S'1}$, if it was not already therein previously. In V1.5 (operation 8) the flip-flop 252 is set in the condition S'1 and in V1.6, the flip-flop 251 is reset in the condition $\overline{S1}$.

In V1.2 (operation 6) the counter 261 is put in the position 1″. In V1.4 (operation 7) the flip-flop 252 is reset in the condition $\overline{S'1}$, if it was not already therein previously. In V1.5 (operation 8) the flip-flop 252 is set in the condition S'1 and in V1.6, the flip-flop 251 is reset in the condition $\overline{S1}$.

During the following times V1.7 to V25 (operation 10) no operation at all is carried out in the circuits 230 and 250. At the time V25, a new comparison is initiated (operations 11 to 14) and in V1.6 one has the condition: 2″, S1, $\overline{S1}$. At the following time V25 the third comparison (operations 16, 17, 18) sets in V1.2 the conditions S1, S'1, S″. At the time V1.3 (operation 18) the AND circuit 315 (FIGURE 8) delivers a signal which forces the counter 261 in position C1, this characterizing the end of the programme.

Referring to the programme IV*a* (Table I) related to the case $\overline{Ro}$ (i.e. no error correction of pulse synchronization to be carried out) it is seen that, at the following time $C2 \times t25$ (operation IV*a*–4) of the programme IV, the selector 341 selects the following trunk for the performance of a new programme III.

TABLE VII

| 1 | 2 | 3 | 4 | 5 |
|---|---|---|---|---|
| | | | | Programme IIIa |
| | | | | Channel synchronization test—Condition R'o—3 successive coincidences. |
| 1 | C2 | V1 | $\overline{S1}$, $\overline{S'1}$, 0″ | Resetting of the flip-flops 251 and 252 (unit 250, FIGURE 8). Setting of the counter 261–1 in position 0″ through the OR circuits 260 and 258 (FIGURE 8). |
| 2 | C2 | t2 | C2×t2=C3 | |
| 3 | C3 | V25 | | Activation of the AND circuits 236 and 239 (unit 230, FIGURE 7). |
| 4 | C3 | V25.1b to V25.8b | | Examination in the code comparator 240, of the message signals occupying 8 successive digit time slots. |
| 5 | C3 | V25.8b | S1 | First coincidence: the comparator 240 delivers a signal on its output 24 and setting of flip-flop S1. |
| 6 | C3 | V1.2 | 0″×V1.2=1″ | Counter 261 in position 1″ (AND circuit 262). |
| 7 | C3 | V1.4 | $\overline{S'1}$ | Resetting of flip-flop S'1. |
| 8 | C3 | V1.5 | S1×V1.5=S'1 | Setting of flip-flop S'1 by the activation of the AND circuit 253 (unit 250, FIGURE 8). |
| 9 | C3 | V1.6 | $\overline{S1}$ | Resetting of flip-flop S1. |
| 10 | C3 | V1.7 to V25 | | No operation performed. |
| 11 | C3 | V25 | | Performance of operation IIIa–3, IIIa–4. |
| 12 | C3 | V25.8b | | See IIIa–5. |
| 13 | C3 | V1.2 | 1″×V1.2=2″ | Counter 261 set in position 2″ after the 2d coincidence. |
| 14 | C3 | V1.4 to V1.6 | S'1, $\overline{S1}$ | See IIIa–7–8–9. |
| 15 | C3 | V1.7 to V25 | | See IIIa–10. |
| 16 | C3 | V25 to V1.1 | S1, S'1 | Performance of operations IIIa–3–4–5. |
| 17 | C3 | V1.2 | 2″×V1.2=3″ | Counter 261 set in position 3″ after the 3d coincidence. |
| 18 | C3 | V1.3 | V1.3×3″×S'1×C3=C1 | The test is stopped after 3 successive coincidences (AND circuit 315). |
| | C1 | V1.4 | $\overline{S'1}$ | |
| 19 | C1 | t23 | C1×t23=C2 | |
| 20 | C2 | | | See IIIa–1. |

TABLE VIII

| 1 | 2 | 3 | 4 | 5 |
|---|---|---|---|---|
| | | | | Program IIIb<br>Channel synchronization test Condition $\overline{R}'o$—First part: 3 successive non-coincidences. |
| 1 | C2 | V1 | $\overline{S1}$, $\overline{S'1}$, 0" | |
| 2 | C2 | t2 | C2×t2=C3 | |
| 3 | C3 | V25 | | See IIIa-3. |
| 4 | C3 | V25.1b to V25.8b | | See IIIa-4. |
| 5 | C3 | V25.8b | $\overline{S1}$ | First non-coincidence: comparator 240 does not deliver any signal on output 24. The flip-flop 251 remains in condition $\overline{S1}$. |
| 6 | C3 | V1. 2 | 0"×V1. 2=1" | |
| 7 | C3 | V1. 3 to V25 | $\overline{S1}$, $\overline{S'1}$ | No operation performed. |
| 8 | C3 | V25 | | See IIIb-3 and IIIb-4. |
| 9 | C3 | V25.8b | $\overline{S1}$ | |
| 10 | C3 | V1. 2 | 1"×V1.2=2" | Second non-coincidence. |
| 11 | C3 | V1.3 to V25 | $\overline{S1}$, $\overline{S'1}$ | See IIIb-7. |
| 12 | C3 | V25 | | See IIIb-8. |
| 13 | C3 | V25.8b | $\overline{S1}$ | |
| 14 | C3 | V1. 2 | 2"×V1.2=3" | Third non-coincidence. |
| 15 | C3 | V1.3c | V1.3c×3"×$\overline{S'1}$=S3=S4 | For three successive noncoincidences, flip-flops 266 and 267 set in condition S3 and S4 (AND circuit 265). |

TABLE IX

| 1 | 2 | 3 | 4 | 5 |
|---|---|---|---|---|
| | | | | Program IIIb<br>Second part:<br>Free synchronization search. |
| 15 | C3 | V1.3c | V1.3c×3"×$\overline{S'1}$=S3=S4<br>S3 | From operation 15, table VIII.<br>A signal on input 26 of OR circuit 231 starts the free synchronization search. |
| 16 | | V1.3d | | A signal on input 26 of digit counter 211 (FIGURE 5) blocks said counter in position 3. |
| 17 | | V1.4 | | A signal on input 42r of the OR circuit 226 blocks the digit counter 161 as soon as it is on position V'1.4'. |
| 18 | | | | Free search during at most a repetition period. |
| 19 | C3 | V'25.8b | S1 | When the code comparator delivers a signal on its output 24 one is virtually at the time V25.8b. |
| 20 | C3 | V'25.8c | S1×c=$\overline{S3}$ | By the activation of the AND circuit 272 (FIGURE 8). Signal 26 is suppressed and counter 210 unblocked (FIGURE 16). |
| 21 | C3 | V'1.2a | S4×5×$\overline{S3}$=0"=$\overline{S1}$ | By the activation of the AND circuit 269. |
| 22 | C3 | V'1.3c | $\overline{S3}$×c×6=$\overline{S4}$ | By the activation of the AND circuit 268. Signal 42r is suppressed and counter 161 is unblocked (FIGURE 16). |
| 23 | C3 | V'2.1a | | Counters 211 and 161 are synchronized (FIGURE 16). |
| 24 | C3 | V'2.1b to V'25.1 | | No operation is performed. |
| 25 | C3 | V'25.1b=V25 | | See IIIa.3, IIIb.3, IIIc.3. |

TABLE X

| 1 | 2 | 3 | 4 | 5 |
|---|---|---|---|---|
| | | | | Program IIIc<br>Channel synchronization test—Condition $\overline{R'o}$—Alternances of coincidences and non-coincidences. |
| 1 | C2 | | $\overline{S1}$, $\overline{S'1}$, 0" | |
| 2 | C2 | t2 | C2×t2=C3 | |
| 3 | C3 | V25 | | See IIIa-3. |
| 4 | C3 | V25.1b to V25.8b | | See IIIa-4. |
| 5 | C3 | V25.8b | S1 | One coincidence—See IIIa-5. |
| 6 | | V1.1a to V1.6 | 1", $\overline{S'1}$, $\overline{S1}$ | See IIIa-6 to 10. |
| 7 | | V1.7 to V25 | | No operation is performed. |
| 8 | | V25.1b to V25.8b | | See IIIa-4. |
| 9 | | V25.8b | $\overline{S1}$ | One non-coincidence—See IIIb-5. |
| 10 | | V1.1a | S'1×$\overline{S1}$=0" | Resetting to zero of the counter 261 by the logical circuits 255 to 258 (unit 250, FIGURE 8). |
| 11 | | V1.2 | 1" | See IIIb-6. |
| 12 | | V1.3 to V25 | $\overline{S1}$, $\overline{S'1}$ | See IIIa-9, IIIa-10. |
| 13 | | | | For the following tests, program IIIa or IIIb if the result is a coincidence or a non-coincidence. |

TABLE XI

| 1 | 2 | 3 | 4 | 5 |
|---|---|---|---|---|
| | | | | Program IIId |
| | | | | Condition R'o. |
| 1 | | tn.6 | (A'D+D'A)×tn.6=Ro | See I-7 and II-1. |
| 2 | C1 | t23 | C1×t23=C2 | See IIIa-2 or IIIb-2 or IIIc-2. |
| | | | $\overline{S1}$, $\overline{S'1}$, 0'' | |
| 3 | C2 | t23.7 | C2×t23.7×Ro=R'o | See II-3. |
| 4 | C2 | t24, t25 | | See II-4, IVb-6, IVb-7. The code of the trunk p for the error correction is selected by selector 341-1. |
| 5 | C2 | t2 | C2×t2=C3 | |
| 6 | C3 | V'25.1'b | | Beginning of signal V25. |
| 7 | C3 | V25 | | Error correction performed—See II-7. Channel synchronization test—See, for example, operation IIIa-4. |
| 8 | C3 | V25.8b | S1 or $\overline{S1}$ | See IIIa-5 (Table VII) or IIIb-5 (Table VIII). |
| 9 | C3 | V1.2 | 0''×V1.2=1'' | See IIIa-6 (Table VII) or IIIb-6 (Table VIII). |
| 10 | C3 | V1.3 | R'o×V1.3×C3=C1 | See II-8 (Table VI). |
| 11 | C1 | t23 | C1×t23=C2 | |
| 12 | C2 | | $\overline{S1}$, $\overline{S'1}$, 0'' | |

The programme III*b* has been shown on two tables: the Table VIII concerns the channel synchronization test and the detection of the 3 non-coincidences and the Table IX, the free synchronization search.

The operations 1, 2, 3 and 4 of this programme are the same as those of programme III*a*.

In V25.8*b* one has the condition S1 (operation 5) and in V1.2 the counter 261 shifts to the position 1'' (operation 6). Between the times V1.3 to V25 one has the conditions S1 and S'1 and no operation is performed (operation 7). The operations 8 to 11 show the second non-coincidence and the operations 12 to 14 the third one. At the time V1.3*c* one has the condition S'1 the AND circuit 265 becomes conductive and the flip-flops 266 and 267 set respectively to the conditions S3 and S4.

As it has been seen previously, during the study of the circuit 210 (FIGURE 5), the digit counters 161 and 211 are blocked and a free synchronization search is initiated (operations 16, 17 and 18). The counter 211 being blocked in the position 3, the signals V25 and V1 are always present.

When the code comparator delivers a signal on its output 24 (operation 19) setting up the conditions S1 this means that one is at the trunk time (V'25.8'6), this time being characterized by the brackets.

During the operations 20, 21, 22, 23 the digit counters are unblocked and synchronized as it has been described previously. From the time V'2.1'*b*) to the time (V'25.1'*b*) on, no operation is carried out. At the time V'25.1'*b* the local clock 310 elaborates the time signal V25 enabling to check the time position of the synchronization code which has just been determined.

It is thus seen that:

The channel synchronization test occupies, in the best case, 3 repetition periods, i.e. when no alternation of coincidences and non-coincidences is detected.

If there are no disturbances in the transmission, the free synchronization search occupies at the maximum one repetition period for detecting the code plus one repetition period for the restarting of the counters and of the time circuit 320 to 323 of the clock 310 (FIGURE 8).

Thus, after a delay of at least two repetition periods after the beginning of the free search initiated by a wrong synchronization, the data store registers the received informations. The writing is correct if the following test detects 3 coincidences; in the opposite case this process resumes.

In the programme III*c* the operations 1 to 7 are the same as the operations 1 to 10 of the programme III*a* since they concern one coincidence.

At the following repetition period (operations 8 and 9) a non-coincidence is detected characterized by the condition $\overline{S1}$. At the time V1.1*a* (operation 10), the condition $S'1\times\overline{S}1$ forces the counter 261 to the position 0''.

In V1.2 the counter 261 is in the position 1'' (operation 11) this being equivalent to the operations III*b*–6 and III*b*–7. One has simultaneously the conditions $\overline{S'1}$ and 1'' characterizing a non-coincidence. The operation resumes in this channel according to the programmes III*a* or III*b* up to the time where the counter 261 arrives in the position 3''.

Last, the programme III*d* related to the condition R'*o* will be studied. The operations 1 to 5 refer to operations already described in the programmes I, II, III and IV. At the time *C*2×*t*25 )operation 4) one has the conditions $\overline{S1}$, $\overline{S'1}$, O'', R'*o* and the code of the trunk *p* on which a programme II has to be performed is shown out on the selector 341. At the following time *t*2, one is at the time C3. Since the time V25 of performance of the corrections occur before the time V1 and since its elaboration is conditioned by the presence of the time signal C3, it will always be the first signal to appear at the time C3 (operation 6). At the time V25 (operation 7) the error is corrected by the programme II and a test of the synchronization code is performed.

At the time V25.8*b* (operation 8) this latter has delivered one of the conditions S1 or $\overline{S1}$, and at the time V1.2 (operation 9), the counter 261 is in the position 1''. At the time V1.3 (operation 10), one shifts back to the time C1, then to the time C2 during which the conditions $\overline{S1}$, $\overline{S'1}$, 0'' (operations 11 and 12) are set up so that the result of this channel synchronization test is not used.

The synchronization circuits just described impede all loss of information during the recording of the message signals in the data store 160 (FIGURES 4 and 5). Nevertheless, in the following study, it will be seen that losses of information may occur during the reading of the store, but that these latter may be disturbed in such a channel as the errors introduced will be reduced to the minimum.

The slow fluctuation of the time position of the message signals with respect the exchange time corresponds to a phase shift depending upon time and it is in accordance with this point of view that said fluctuation has been studied in relation with the FIGURE 3. It may also be considered as a difference between the mean repetition frequency *Fe* of the message signals received at the input of the exchange and the frequency *Fe* of the digit time slot signals (*t*1.1 *to* *t*25.8) elaborated in the exchange, if it is assumed for the convenience of the discussion, that each digit time slot at the trunk time carries one message signal.

It will be reminded that, when no correct is carried out, the digit counter of the data store advances by one position at each time *c* of the exchange.

The expression $f=|Fe-Fc|$(1) represents the beat frequency between the two time scales. The number *f* is the difference, during one second, between the number of received message signals and the number of digit time slot signals elaborated by the clock 310 (FIGURE 8). If $Fe>Fc$ more message signals have been received than there were digit time slot signals and inversely.

If $\varphi$ designates the frequency of apparition of the synchronization code ($\varphi=10$ *kHz.*) it will be assumed that $f<<\varphi$, this meaning, as it has been explained at the beginning of the description, that the beat frequency due to the slow fluctuation is very low. In fact, as it depends mainly of the temperature (action on the clocks and on the transmission) and of the frequency difference between the clocks, its variation is slow and it changes its sign only very rarely. In other words, the corrections will be carried out in the same direction (lead or lag) during very long time intervals: thus, for instance, it will be possible to have several hundreds of successive lead operations on a given trunk.

It has been seen, during the study of the synchronization circuits, that the loss of information at the writing which could result when *f* is different from zero was transferred to the time of passage of the synchronization channel which is not registered in the data store and that the message signals of the channels W1 to W24 are written in their exact addresses.

Nevertheless, this operation has been carried out at the cost of a modification of the rate of advance of the digit counter of the data store, this rate becoming $F'c=Fc\pm f$, the sign "+" corresponding to the performance of a lead operation and the sign "—" to the performance of a lag operation. It may be said that F'*c* is the means frequency of the exchange time for the write-in operation.

It has been seen, during the description of FIGURE 2, that the basic time slots *a* and *b* have been reserved in the data store for the writing, and the basic time slots *c* and *d* for the reading. Since the common switch circuit of an exchange treats the informations received from $n_1$ incoming trunks in order to distribute the $n_2$ outgoing trunks, all the informations on which it operates must be positioned on the same time scale, and therefore the reading times must be based on the exchange time F*c*.

Since the write-in and read-out frequencies F'*c* and F*c*, are different, the problem of the difference between the trunk time and the writein is now, the problem of the difference between the write-in frequency and the read-out frequency.

During the time reserved to the read-out in the data store, the informations related to one channel and which are stored in a given address are extracted. The choice of this address has been determined, by channel of example, by a connection rearrangement operation as it has been described in the French Patent No. 1,212,984 called "Switching Systems Between Multiplex Communication Channels."

This means that the reading of a signal W7.1 for instance, may occur at any time of the exchange with respect to the time of the exchange at which said signal has been registered itself in the store.

It will be admitted that, during the considered period the read-out time of the considered channel is not modified by a rearrangement operation.

On another side, two different types of performance of the data store 160 will be considered. In the first type, when a digit 1 is stored in one of its unit storage cells, the inscription of a new digit 1 or 0 does not modify the state thereof and when the digit 0 is stored therein, the inscription of a new digit 1 sets it in the 1 state, i.e. disturbs the information contained therein. Therefore, it will be admitted that in such a store the contents of a column is completely disturbed if a writing operation is carried out before the reading of the information which was previously recorded.

In the second type, the inscription of a digit in a unit cell, suppresses the information which was stored so that the new digit is exact.

As an example, one will consider the fourth message signal on the channel 13 referenced W13.4*j*, *j* indicating the repetition period on the trunk.

As it has been explained in relation with the description of the retiming unit, the signal W13.4*j* is always stored in the unit storage cell V'13.4' of the store which is assigned to it, or in other words the counters 166 and 161 of the data store 160 (FIGURES 4 and 5) mark respectively the column 13 and the line 4 when the message signal W13.4 is applied to the store so that said message be recored therein. This is obtained by the intervention of the error correction unit 210.

If a time lead operation must be performed between the inscription of the signal W13.4*j* and the inscription of the signal W13.4 ($j+1$) one takes the advantage of the time interval during which the synchronization signals, which are not registered (counter 166 in the position V'25), are received at the input of the store in order to provoke a jump of the counter 161 from the position 3' to the position 5'. The signal W13.4 ($j+1$) is thus inscribed, in the unit cell of the data store which assigned to it, this happening 199 digit time slots after the inscription of the signal W13.4*j*.

In the case of a lag operation, carried out between the inspection of the signals W13.4*j* and W13.4 ($j+1$) one blocks, during the reception of the synchronization signals, the counter 161 on the position 4' during two successive digit time slots, so that the signal W13.4 ($j+1$) is inscribed 201 digit time slots after the signal W13.4*j*. The reading of the unit cell V'13.4' assigned to the signal W13.4*j* is carried out regularly, at 200 digit time slot intervals.

The time interval which elapses between the writing of a signal and its reading may range between 0 and 200 digit time slots and it is the same for the seven signals of a message such as W13.1*j* to W13.7*j*.

Since the time intervals between two successive readings in a same unit storage cell are constant, and since the time intervals between two successive inscriptions, in this same unit cell, of the signals such as W13.4*j* and W13.4 ($j+1$) are shortened or lengthened by a digit time slot, respectively when a lead or a lag operation is carried out, it is understood that a signal is lost in two cases:

When a signal (W13.4*j* for instance) stored at the basic time slot *b* of the digit time slot *t* (at the exchange time) and is read immediately afterwards, i.e. at the basic time slot *d*, $t-d$, if a lag operation occurs (when the decoders 166 and 161 show out respectively the positions V'25 and 3') the signal W13.4 ($j+1$) is recorded at the time $(t+201)-a$, but the corresponding unit cell has been read at the time ($t+200d$) while its contents had been suppressed during the previous read operation at the time $t-d$. A digit 0 is thus read. When a signal (W13.4*j* for instance) is inscribed at the time $t-b$ and read at the time $(t+199)-d$, if a lead operation occurs (decoders 166 and 161 respectively in the position V'25 and 4') the signal W13.4 ($j+1$) is inscribed at the time $(t+199)-b$ the corresponding cell being read at the time $(t+199)d$. In this case, two write-in operations are carried out in a same cell before the read-out operation occuring at the time $(t+199)-d$ and an erroneous signal is read except in the particular cases of couples of signals W13.4*j*, W13.4 ($j+1$) i.e. 00 and 01.

Generally, a lead operation increases by one digit time slot the time elapsing between the writing and the reading of a signal in a given cell and a lag operation decreases it by a digit time slot. When a large number of identical corrections are carried out successively (lead or lag), each channel is thus disturbed every 200 corrections, and in this case, the seven signals of the channel are disturbed and the message is lost.

In some known pulse synchronization systems, one signal in each of 7 messages occuring in time succession would be lost. It is seen that one has 7 times less errors in the device according to the invention.

If for instance, the slow fluctuation corresponds to a difference of $10^{-5}$ between the trunk time and the exchange time, for $Fe \cong Fc \cong 2 \times 10^6$ Hz., one has $f=20$ Hz., i.e. 20 error corrections per second. Since an average of 200 successive corrections is necessary in order to lose one code, this loss will happen once every 10 seconds. Since $10^4$ codes related to one given channel are transmitted per second, one will have on this channel, one lost code out of $10^5$, this being a very low figure.

What we claim is:

1. A pulse code modulation time division multiplex telephone switching system comprising a plurality of trunklines incoming from a distant location to an associated local trunk circuit, means whereby each of said trunklines carry a plurality of time positioned channels, means for transmitting samples of intelligence in pulse code modulated form over said lines during discrete time channels, the transmission characteristics of said lines sometimes causing time fluctuations of signals in said channels, means associated with each of said trunks for receiving and storing the pulse code modulations of said samples in locations corresponding to the time positions of channels carrying said intelligence, a local clock, means for cyclically connecting each incoming trunkline to a circuit for detecting synchronization variations between incoming signals and the output of said local clock, means in each of said trunk circuits for extracting a time reference signal from each of said incoming signals, means for comparing the output of said local clock to the extracted time signal, and means for retiming the pulse code modulations of incoming signal responsive to a detection of an excessive time fluctuation between said extracted reference signal and the output of said local clock, whereby said received signal reappears in the part of the time channel that is reserved for transmission of said intelligence.

2. The system of claim 1 wherein said synchronizing circuit comprises a common circuit, coincidence detection means for sending a coincidence signal when a full complement of pulse code signals coincides with a synchronization code sent over at least one of said channels, and error correction means for modifying an advance of an address selection of said stored data to select in time succession the sample storage locations corresponding to said time periods.

3. The system of claim 2 and a pair of trunk selection means, means comprising a first of said trunk selection means for providing pulse synchronization information relative to said trunks, means comprising a second of said trunk selection means for providing pulse synchronization information relative to said channels, means for operating said pair of selectors to select all of said trunks successively, and means for interrupting the channel synchronization operation over a given trunk selected by the second trunk selector when the operation executed over the trunk selected by the first trunk selector has delivered a pulse synchronization information, for selecting said trunk with the second trunk selector and for controlling, through said information the correction of the pulse synchronization.

4. The system of claim 3 and a pulse shaper, a regenerative repeater for delivering regenerated signals to said pulse shaper, and means responsive to the output of said repeater for providing alternate digit time slots and a signal centered at the theoretical mean position of a message signal, said signal having a duration of one digit time slot.

5. The system of claim 4 wherein said last-named means comprises a phase averaging circuit, a limiter, and a scale-of-two-divider having two output terminals, said alternate time slots appearing at said two terminals.

6. The system of claim 5 wherein said common circuit comprises means for comparing the time positions of two series of signals representing the basic time slot signals and the trunk channel time as indicated by signals at one of said output terminals, the output of said comparing means being a present pulse position signal, said retiming means comprising means for storing the present position signal, a pair of buffer storage means for alternately storing message signals responsive to signals at said two output terminals, means for reading out the signals in one of said buffer stores while signals are being stored in the other of said buffer stores, means whereby said read out coincides with a basic time slot selected responsive to said present position signal, and variable delay means for receiving the signals read out of said buffer store.

References Cited by the Examiner

UNITED STATES PATENTS

| | | | |
|---|---|---|---|
| 3,029,311 | 4/1962 | Ward | 179—15 |
| 3,041,400 | 6/1962 | Faulkner | 179—15 |

DAVID G. REDINBAUGH, *Primary Examiner.*

T. G. KEOUGH, *Assistant Examiner.*